US012811494B2

(12) United States Patent
Damideh et al.

(10) Patent No.: US 12,811,494 B2
(45) Date of Patent: Nov. 24, 2026

(54) PULSED-POWER DRIVER WITH MODULAR CONSTRUCTION

(71) Applicant: FUSE ENERGY TECHNOLOGIES CORP., San Leandro, CA (US)

(72) Inventors: Vahid Damideh, Napierville (CA); Jean-Christoph Btaiche, Palo Alto, CA (US); Pierre Tochon, Napierville (CA); Ayan Choudhury, Napierville (CA); Alexei Akoulov, Napierville (CA); Isaac Hassen, Napierville (CA); Alex Scott McDonald, Napierville (CA); Elahe Aranfar, Napierville (CA)

(73) Assignee: FUSE ENERGY TECHNOLOGIES CORP., San Leandro, CA (US)

( * ) Notice: Subject to any disclaimer, the term of this patent is extended or adjusted under 35 U.S.C. 154(b) by 206 days.

(21) Appl. No.: 18/662,920

(22) Filed: May 13, 2024

(65) Prior Publication Data

US 2024/0429813 A1 Dec. 26, 2024

Related U.S. Application Data

(60) Provisional application No. 63/509,165, filed on Jun. 20, 2023.

(51) Int. Cl.
*H02M 3/00* (2006.01)
*H02M 3/06* (2006.01)

(52) U.S. Cl.
CPC ............. *H02M 3/003* (2021.05); *H02M 3/06* (2013.01)

(58) Field of Classification Search
CPC ......... H02M 3/003; H02M 3/06; H02M 7/106
See application file for complete search history.

(56) References Cited

U.S. PATENT DOCUMENTS

2015/0366045 A1* 12/2015 Stoltzfus .................. H05H 7/02 315/501
2018/0367125 A1* 12/2018 Yeckel .................. H03K 3/537
(Continued)

FOREIGN PATENT DOCUMENTS

CA 2662225 A1 * 12/2009 ............... C25B 9/23

OTHER PUBLICATIONS

Conti, F. et al. "MA-class linear transformer driver for z-pinch research". Physical Review 006 Accelerators and Beams 23, 090401, pp. 1-15 (2020) (Year: 2020).*
(Continued)

*Primary Examiner* — Menatoallah Youssef
*Assistant Examiner* — Michael J Warmflash
(74) *Attorney, Agent, or Firm* — MASCHOFF BRENNAN; Paul G. Johnson

(57) ABSTRACT

A pulsed-power driver with modular construction is presented. The pulsed-power driver includes a voltage adder assembly and a transmission line that extend along a driver axis from an upstream end to a downstream end. The voltage adder assembly has a modular construction and is disposed around the transmission line. The voltage adder assembly includes a number of stages axially distributed along the driver axis. The transmission line includes an inner conductor and an outer conductor. The outer conductor includes a modular segmented construction along the driver axis that includes a number of outer conductor segments corresponding to the number of stages. The pulsed-power driver further includes a plurality of stage insulators longitudinally interleaved between each pair of adjacent outer conductor segments, and the outer conductor segments of each pair are electrically connected to each other in series via a corresponding stage of the voltage adder assembly.

24 Claims, 18 Drawing Sheets

(56) References Cited

U.S. PATENT DOCUMENTS

2025/0350198 A1* 11/2025 Damideh ................ G21B 1/21
2025/0351258 A1* 11/2025 Damideh ................ H05H 1/46

OTHER PUBLICATIONS

Stygar, W.A. et al. "Impedance-matched Marx generators". Physical Review Accelerators 036 and Beams 20, 040402, pp. 1-16 (2017) (Year: 2017).*
Auluck, S. et al. "Update on the Scientific Status of the Plasma Focus". Plasma 4, 450-669 (2021).
Avaria, G. et al. "Bayesian inference of spectrometric data and validation with numerical simulations of plasma sheath diagnostics of a plasma focus discharge". Sci Rep 12, 15601, pp. 1-12 (2022).
Awe, T. J. et al. "Observations of Modified Three-Dimensional Instability Structure for Imploding Z-Pinch Liners that are Premagnetized with an Axial Field". Phys Rev Lett 111, 235005, pp. 1-5 (2013).
Bhartiya, P. et al. "Pulsed 3.5 GHz high power microwaves irradiation on physiological solution and their biological evaluation on human cell lines". Sci Rep 11, 8475, pp. 1-16 (2021).
Chen, L. et al. "Development of a fusion-oriented pulsed power module". Physical Review Accelerators and Beams 22, 030401, pp. 1-15 (2019).
Conti, F. et al. "MA-class linear transformer driver for z-pinch research". Physical Review Accelerators and Beams 23, 090401, pp. 1-15 (2020).
Damideh, V. et al. "Characteristics of Fast ion beam in Neon and Argon filled plasma focus correlated with Lee Model Code". Vacuum 169, 108916, pp. 1-6 (2019).
David L. Smith, "M. E. S. ZR Marx capacitor lifetime test results". in Conference Record of the Twenty-Sixth International Power Modulator Symposium, 2004 and 2004 High-Voltage Workshop. 530-533 (IEEE). doi:10.1109/MODSYM.2004.1433631.
Engelbrecht, J. T. et al. "Initial conditions in the hawk dense plasma focus". in 2019 IEEE Pulsed Power & Plasma Science (PPPS) 1-5 (IEEE, 2019). doi:10.1109/PPPS34859.2019.9009625.
Esplen, N. et al. "Dosimetric characterization of a novel UHDR megavoltage X-ray source for FLASH radiobiological experiments". Sci Rep 14, 822, pp. 1-14 (2024).
Faenov, A. Y. et al. "Advanced high resolution x-ray diagnostic for HEDP experiments". Sci Rep 8, 16407, pp. 1-9 (2018).
Gomez, M. R. et al. "Performance Scaling in Magnetized Liner Inertial Fusion Experiments". Phys Rev Lett 125, 155002, pp. 1-7 (2020).
Gribkov, V. A. et al. "Plasma dynamics in the PF-1000 device under full-scale energy storage: II. Fast electron and ion characteristics versus neutron emission parameters and gun optimization perspectives". J Phys D Appl Phys 40, 3592-3607 (2007).
Hadjisolomou, P., Jeong, T. M. & Bulanov, S. V. "Towards bright gamma-ray flash generation from tailored target irradiated by multi-petawatt laser". Sci Rep 12, 17143, 1-11 (2022).
HOFSTRA Group, "Triggered Spark Gap Design," Downloaded from the web on May 10, 2024, from: https://hofstragroup.com/triggered-spark-gap-design.html#:~:text=Changing%20the%20voltage%20of%20the,%3A%20field%2Ddistortion%20triggered%20spark. 10 pages.
Kang, Y., et al., "Principal Dynamic Mode Analysis of EEG Data for Assisting the Diagnosis of Alzheimer's Disease," IEEE J Transl Eng Health Med. Feb. 5, 2015;3:1800110. doi: 10.1109/JTEHM.2015.2401005. PMID: 27170890; PMCID: PMC4848106. 10 pgs.
Kim, A. A. et al. "Development and tests of fast 1-MA linear transformer driver stages". Physical Review Special Topics—Accelerators and Beams 12, 050402, pp. 1-10 (2009).
Lechien, K. et al. "A 1-MV, 1-MA, 0.1-Hz linear transformer driver utilizing an internal water transmission line". in 2009 IEEE Pulsed Power Conference 1186-1191 (IEEE, 2009). doi:10.1109/PPC.2009.5386430. 6 pages.
Lechien, K. R. et al. "Sirius I: Prototype of a Prime-Power Source for Future 1-10 GJ Fusion-Yield Experiments". 14 pages. (2023).
Lee, S., Damideh, V. & Btaiche, J. C. "MagLIF: Dynamics and energetics of liner and fuel". Vacuum 216, 112471, pp. 1-11 (2023).
Lu, Y. et al. "A compact platform for the investigation of material dynamics in quasi-isentropic compression to ~ 19 GPa". Sci Rep 11, 20688, pp. 1-12 (2021).
Mehlhorn, T. A. "National Security Research in Plasma Physics and Pulsed Power: Past, Present, and Future". IEEE Transactions on Plasma Science 42, 1088-1117 (2014).
Min, S.-H. et al. "Effects on electronics exposed to high-power microwaves on the basis of a relativistic backward-wave oscillator operating on the X-band". J Electromagn Waves Appl 31, 1875-1901 (28 pages) (2017).
Nowak, M. "The concept of a new two-stage fuse for high power pulse forming". Sci Rep 12, 18176, pp. 1-18 (2022).
Obenschain, S. et al. "High-energy krypton fluoride lasers for inertial fusion". Appl Opt 54, F103-F122 (2015).
Owens, I. et al. "Electro-optical measurement of intense electric field on a high energy pulsed power accelerator". Sci Rep 11, 10702, pp. 1-7 (2021).
R Jagan Mohan Rao, "What is a Capacitor Bank," Inst Tool. Downloaded from the web on May 6, 2024, from: https://instrumentationtools.com/what-is-a-capacitor-bank/. 11 pages.
Savage, M. E. et al. "Pulsed power performance of the Z machine: Ten years after the upgrade". in 2017 IEEE 21st International Conference on Pulsed Power (PPC) 1-6 (IEEE, 2017). doi:10.1109/PPC.2017.8291252.
Schmidt, A. et al. "First Experiments and Radiographs on the MegaJOuLe Neutron Imaging Radiography (MJOLNIR) Dense Plasma Focus". IEEE Transactions on Plasma Science 49, 3299-3306 (2021). pp. 1-8 (10 pages) (LLNL-JRNL-827704).
Sinars, D. B. et al. "Review of pulsed power-driven high energy density physics research on Z at Sandia". Phys Plasmas 27, 070501, pp. 1-26 (2020).
Sohrabi, M., Zarinshad, A. & Habibi, M. "Breakthrough in 4π ion emission mechanism understanding in plasma focus devices". Sci Rep 6, 38843, pp. 1-15 (2016).
Spielman, R. B. et al. "Conceptual design of a 15-TW pulsed-power accelerator for high-energy-density-physics experiments". Matter and Radiation at Extremes 2, 204-223 (2017).
Sporer, B. J. et al. "Multicavity linear transformer driver facility for z-pinch and high-power microwave research". Physical Review Accelerators and Beams 24, 100402, p. 1-13 (2021).
Stygar, W. A. et al. "Architecture of petawatt-class z-pinch accelerators". Physical Review Special Topics—Accelerators and Beams 10, 030401, pp. 1-24 (2007).
Stygar, W. A. et al. "Conceptual designs of two petawatt-class pulsed-power accelerators for high-energy-density-physics experiments". Physical Review Special Topics—Accelerators and Beams 18, 110401, pp. 1-30 (2015).
Stygar, W. A. et al. "Impedance-matched Marx generators". Physical Review Accelerators and Beams 20, 040402, pp. 1-16 (2017).
Stygar, W. et al. "Conceptual design of a 960-TW accelerator powered by impedance-matched Marx generators". in 2017 IEEE 21st International Conference on Pulsed Power (PPC) 1-8 (IEEE, 2017). doi:10.1109/PPC.2017.8291256.
Valenzuela, J. C. et al. "Measurement of temperature and density using non-collective X-ray Thomson scattering in pulsed power produced warm dense plasmas". Sci Rep 8, 8432, pp. 1-8 (2018).
Venkata Ramudu, B., Reddy, C. J. & Madhu, V. "Flash X-ray radiography technique to study the high velocity impact of soft projectile on E-glass/epoxy composite material". Defence Technology 15, 216-226 (2019).
Wikipedia. "Linear transformer driver". Downloaded on May 6, 2024, from: https://en.wikipedia.org/wiki/Linear_transformer_driver. 3 pages.
Wikipedia. "Marx generator". Downloaded on May 6, 2024, from: https://en.wikipedia.org/wiki/Marx_generator. 6 pages.
Wurden, G. A. et al. "Magneto-Inertial Fusion". Journal of Fusion Energy 35, 69-77 (2016).
Yager-Elorriaga, D. A. et al. "An overview of magneto-inertial fusion on the Z machine at Sandia National Laboratories". Nuclear Fusion 62, 042015, pp. 1-19 (2022).

(56) References Cited

OTHER PUBLICATIONS

Zylstra, A. B. et al. "Burning plasma achieved in inertial fusion". Nature 601, 542-548 (2022).

* cited by examiner

PULSED-POWER DRIVER WITH MODULAR CONSTRUCTION

CROSS REFERENCE TO RELATED APPLICATIONS

The present application claims priority to and the benefit of U.S. provisional patent application Ser. No. 63/509,165 entitled "Pulsed-Power Drivers And Associated Methods", filed on Jun. 20, 2023, the disclosure of which is incorporated herein by reference in its entirety.

TECHNICAL FIELD

The present disclosure generally relates to pulsed power technologies and, more particularly, to pulsed-power drivers and associated structures and methods.

BACKGROUND

Pulsed magneto-inertial fusion approaches use pulsed-power drivers to deliver power to the fusion load. Desirable characteristics of pulsed-power drivers include the ability to generate fast-rising, high-voltage, and high-current pulses with high efficiency. Various proposed fusion reactor architectures—such as dense plasma focus, gas-puff Z-pinch, sheared-flow-stabilized Z-pinch, field-reversed configuration, and linear and toroidal theta pinches—have used or been designed to use conventional fast-discharge capacitor banks for pulsed-power supply. Such capacitor banks are unable to generate MV pulses at MA current levels in with short rise times. Certain facilities, such as HAWK and MJOLNIR, have used Marx generator systems as pulsed-power drivers in order to achieve such higher-voltage pulses, but achieving high currents (several MA) with short rise times (~100 ns) has remained challenging. Based on work conducted at Sandia National Laboratories over the past decade, a Z-pinch-based magneto-inertial fusion concept referred to as magnetized liner inertial fusion (MagLIF) is presently considered as one of the most promising approaches to achieving controlled fusion. Sandia's Z Pulsed Power Facility, which has been used to conduct MagLIF experiments, employs Marx-based generators provided with several stages of pulse forming lines and switches for pulse compression. These generators have energy loss rates that increase with decreasing pulse rise times, with the result that a major proportion of the input energy is lost at rise times of ~100 ns. The lost energy is dissipated into heat, creating thermal loads on the generator components that can cause severe structural damage or failure, especially when the generator is operated in repetitive mode.

In order to overcome or mitigate drawbacks and limitations associated with conventional Marx-based systems, other pulsed-power driver technologies have been proposed. One example is the linear transformer driver (LTD) technology. In the LTD architecture, pulsed power is generated by a larger number of basic pulse-forming circuits (or "bricks") having the desired rise time. Each brick typically includes a pair of capacitors and a single switch electrically connected in series. The bricks are enclosed into a single or multiple axially distributed LTD cavities electrically connected in series, and each LTD cavity is a cylindrical annular enclosure that contains a set of azimuthally distributed bricks electrically connected in parallel together with toroidal magnetic cores to prevent parasitic current loss to the cavity enclosure. The number of cavities and the number of bricks per cavity can be selected to achieve a desired voltage and current. LTDs can generate high-current pulses with ~100-ns rise times without any of the pulse compression circuits typically required in conventional Marx-based systems. Challenges associated with LTD-based drivers include a high component count (which makes the likelihood of individual component failures higher and the tracking of such failures harder), a high cost and weight (e.g., due to the magnetic cores), and a complex implementation (e.g., triggering). Coreless pulsed-power drivers, such as impedance-matched Marx generators (IMGs), have also been proposed. IMG-based drivers use a similar approach to LTD-based drivers of stacking a large number of pulse-forming bricks in series and parallel to achieve shorter rise times than conventional Marx-based systems, with the added benefits of slightly higher efficiency and lower cost and weight due to the absence of magnetic cores.

SUMMARY

The present disclosure generally relates to IMG-based pulsed-power drivers.

In accordance with an aspect of the present disclosure, there is provided a pulsed-power driver that extends along a longitudinal driver axis from an upstream end to a downstream end. The pulsed-power driver can have an IMG-based architecture. The pulsed-power driver includes a voltage adder assembly and a transmission line that both extend along the driver axis from the upstream end to a downstream end. According to an embodiment of the present disclosure, the pulsed-power driver has a modular construction and design for both the voltage adder assembly and the transmission line. The modularity of the pulsed-power driver according to the present disclosure can provide advantages in terms of ease of assembly, disassembly, and maintenance operations, as well as in terms of providing configuration flexibility and scalability.

The voltage adder assembly according to the present disclosure is disposed (e.g., coaxially) around the transmission line with respect to the driver axis. The voltage adder assembly includes a number of stages, including one or more stages, axially distributed along the driver axis and electrically connected to one another in series. Each stage includes one or more pulse-forming circuits (also referred to as "bricks") azimuthally distributed about the driver axis and electrically connected to one another in parallel. In some embodiments, each pulse-forming circuit according to the present disclosure can be provided as an RLC drive circuit including a pair of capacitors and a switch electrically connected in series. The voltage adder assembly is configured to generate an electrical pulse from a plurality of individual pulses respectively generated by triggering the plurality of pulse-forming circuits. The electrical pulse generated by the voltage adder assembly is configured to drive the transmission line, and the transmission line is configured to drive a load (e.g., an impedance-matched load).

The transmission line includes an inner conductor and an outer conductor. The outer conductor is disposed (e.g., coaxially) around the inner conductor with respect to the driver axis. According to an embodiment of the present disclosure, the inner conductor and the outer conductor can have a modular segmented configuration along the driver axis. Accordingly, the inner conductor can include a plurality of inner conductor segments, and the outer conductor can include a plurality of outer conductor segments. In some embodiments according to the present disclosure, the transmission line is impedance-matched to the voltage adder assembly, wherein the segment-to-segment longitudinal impedance profile of the transmission line along the driver axis is matched to the stage-to-stage longitudinal impedance profile of the voltage adder assembly. According to an embodiment of the present disclosure, adjustment of the longitudinal impedance profile of the transmission line can be achieved by providing the inner conductor with a longitudinally tapered configuration (e.g., stepped or linearly tapered) from the upstream end to the downstream end, wherein the radii of the inner conductor segments gradually decrease from the upstream-most to the downstream-most of the inner conductor segments. According to an embodiment of the present disclosure, the pulsed-power driver can include a plurality of stage insulators longitudinally interleaved between each pair of adjacent outer conductor segments, and the outer conductor segments of each pair are electrically connected to each other in series via a corresponding stage of the voltage adder assembly. For example, the corresponding stage can straddle the transition plane between the two conductor segments, with one capacitor of each pulse-forming circuit of the stage located upstream of the transition plane, the other capacitor located downstream of the transition plane, and the switch of each brick extending on both sides of the transition plane to make (electrical) contact with the two capacitors, thereby providing a substantially symmetrical arrangement of the stage about the transition plane.

It is appreciated that longitudinally segmenting of the inner conductor and the outer conductor according to the present teachings to provide the transmission line with a modular design that matches the modular division of the voltage adder assembly into a longitudinal distribution of stages can be advantageous in terms of improving ease and reducing cost and time of assembly and maintenance operations.

The transmission line according to the present teachings can include sealed mechanical joints or connections configured to provide a releasable connection or coupling between each pair of adjacent inner conductor segments. In some embodiments, each pair of adjacent inner conductor segments may be connected to each other using a sealed mechanical connection that includes a plurality of azimuthally spaced compression bolts and at least one gasket or O-ring together configured to provide a durable, releasable, and leak-tight joint. For example, the bolt can act as mechanical fasteners that join together flanged ends of the inner conductor segments, while the gasket can be inserted into a groove formed in one or both of the inner conductor segments to provide a hermetic seal. Other types of sealed mechanical connections can be used in other embodiments according to the present disclosure, including, for example, compression sheets or sealing glue.

The transmission line according to the present teachings can also include sealed mechanical joints or connections configured to provide a releasable connection or coupling between each pair of adjacent outer conductor segments with the stage insulator interleaved therebetween. The coupling between each pair of adjacent outer conductor segments can also be configured to ensure that the path of electrical current that flows along the outer conductor between the upstream end and the downstream end also passes through each stage of the voltage adder assembly. In some embodiments according to the present disclosure, each pair of adjacent outer conductor segments may be connected to each other with the stage insulator interleaved therebetween using a sealed mechanical connection that includes a plurality of azimuthally spaced compression bolts and a set of gaskets or O-rings together configured to provide a durable, releasable, and leak-tight joint. For example, the bolts can act as mechanical fasteners that join a flanged end of each outer conductor segment to the stage insulator, while the gaskets can be inserted into grooves formed on both sides of the stage insulators to provide a hermetic seal. Other types of sealed mechanical connections can be used in other embodiments, for example, compression sheets and sealing glue.

In some embodiments according to the present disclosure, the pulsed-power driver includes an oil section extending outside the outer conductor, a deionized water section extending between the inner conductor and the outer conductor, and an air section extending inside the inner conductor. In such embodiments, the sealed mechanical connections between the inner conductor segments and the sealed mechanical connections between the outer conductor segments can prevent leakage between the oil, deionized water, and air section.

In some embodiments according to the present disclosure, the pulsed-power driver may be configured for use in a vertical implementation, as defined by the driver axis being vertical, that is, oriented along a direction that is substantially parallel to the force of gravity (i.e., gravity vector). In other embodiments according to the present disclosure, the pulsed-power driver may be configured for use in a horizontal implementation, as defined by the driver axis being horizontal, that is, oriented along a direction that is substantially perpendicular to the force of gravity.

In some embodiments according to the present disclosure, the number of inner and outer conductor segments is the same as the number of stages of the voltage adder assembly, wherein each conductor-segment transition plane is longitudinally aligned with a corresponding one of the stages.

In accordance with another aspect of the present disclosure, there is provided a method for assembling or disassembling at least part of a pulsed-power driver such as disclosed herein, wherein the pulsed-power driver includes a voltage adder assembly and a transmission line having both a longitudinally modular construction.

Other objects, features, and advantages of the present disclosure will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIGS. 1 to 13F illustrate various aspects, features, and implementations of, or related to, the techniques disclosed herein. In particular, FIG. 1 shows a perspective view of a pulsed-power driver according to an embodiment of the present disclosure, FIG. 2 shows a sectional view of the pulsed-power driver of FIG. 1, FIG. 3 shows a longitudinal cross-sectional view of the pulsed-power driver of FIG. 1, FIG. 4 shows a radial cross-sectional view of the pulsed-power driver of FIG. 1, FIG. 5 shows details of a pulse-forming circuit of the pulsed-power driver of FIG. 1, FIG. 6 and FIG. 7 show structural and assembly details of inner conductor segments of the pulsed-power driver of FIG. 1, FIG. 8 and FIG. 9 show structural and assembly details of outer conductor segments of the pulsed-power driver of FIG. 1, FIG. 11 shows a perspective view of a pulsed-power driver according to an embodiment of the present disclosure that is implemented in a vertical arrangement, FIG. 12 shows a sectional view of the pulsed-power driver of FIG. 11, and FIG. 13A, FIG. 13B, FIG. 13C, FIG. 13D, FIG. 13E and FIG. 13F show various steps of a method according to the present disclosure.

DETAILED DESCRIPTION

Figure 1:
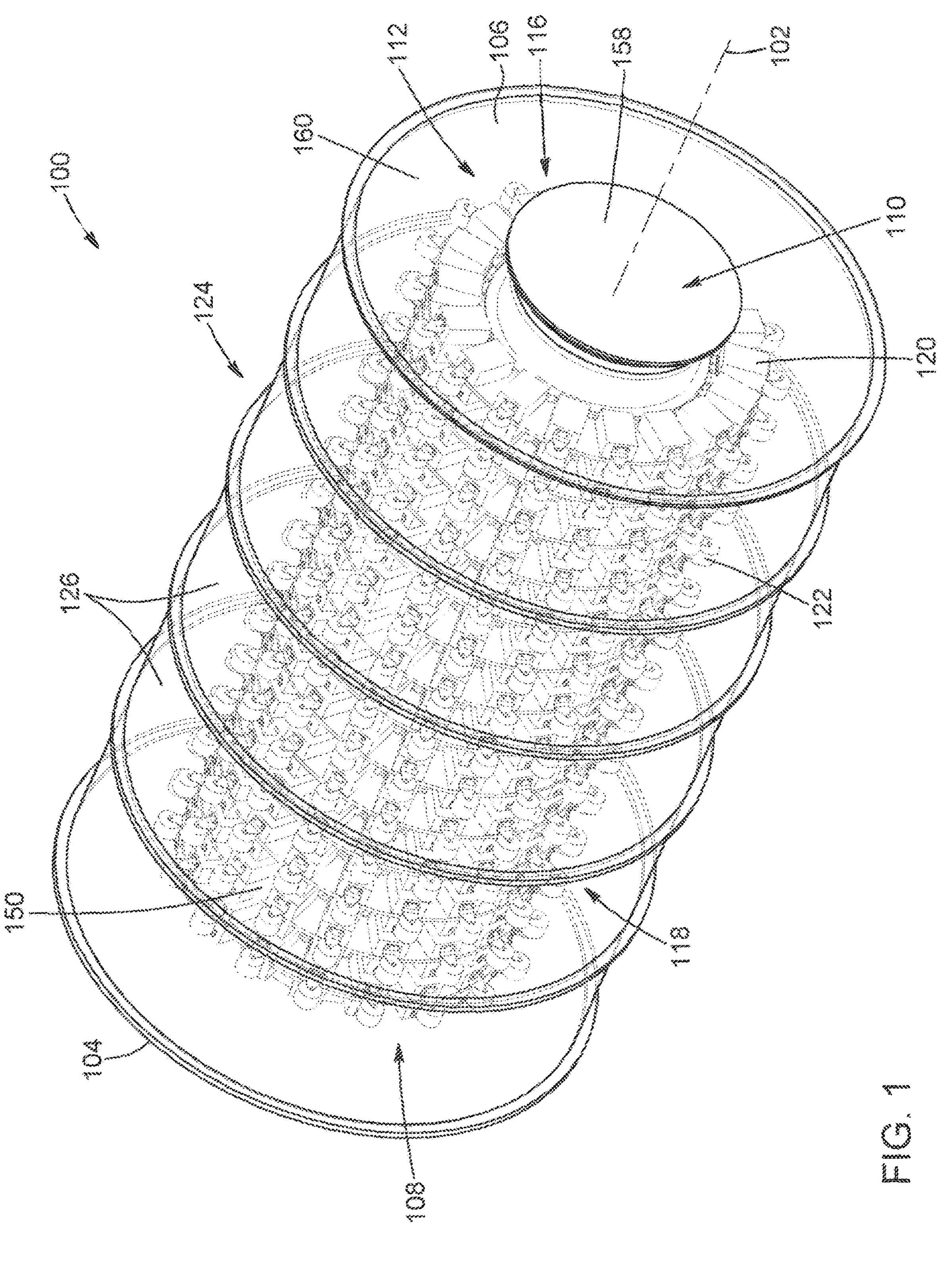
Figure 2:
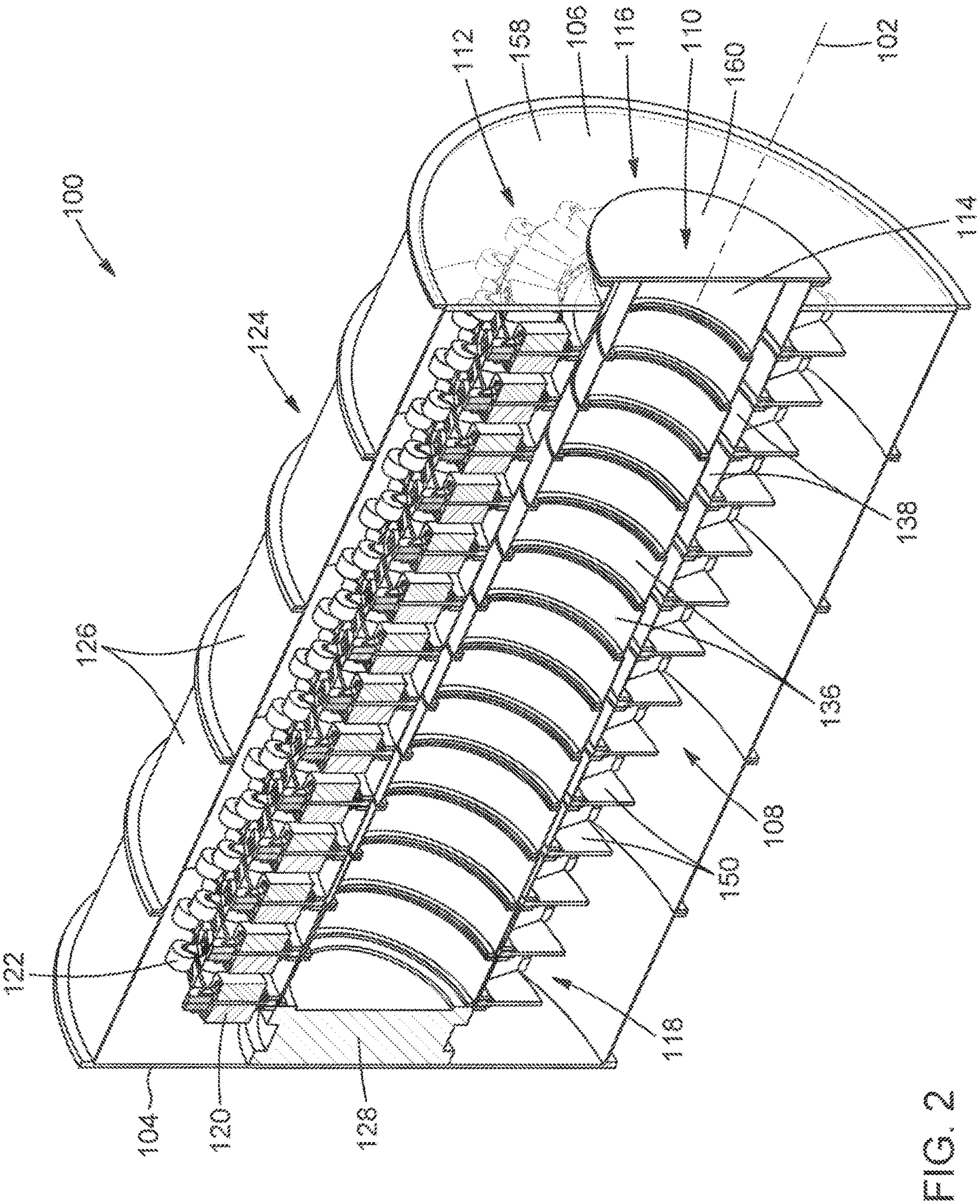
Figure 3:
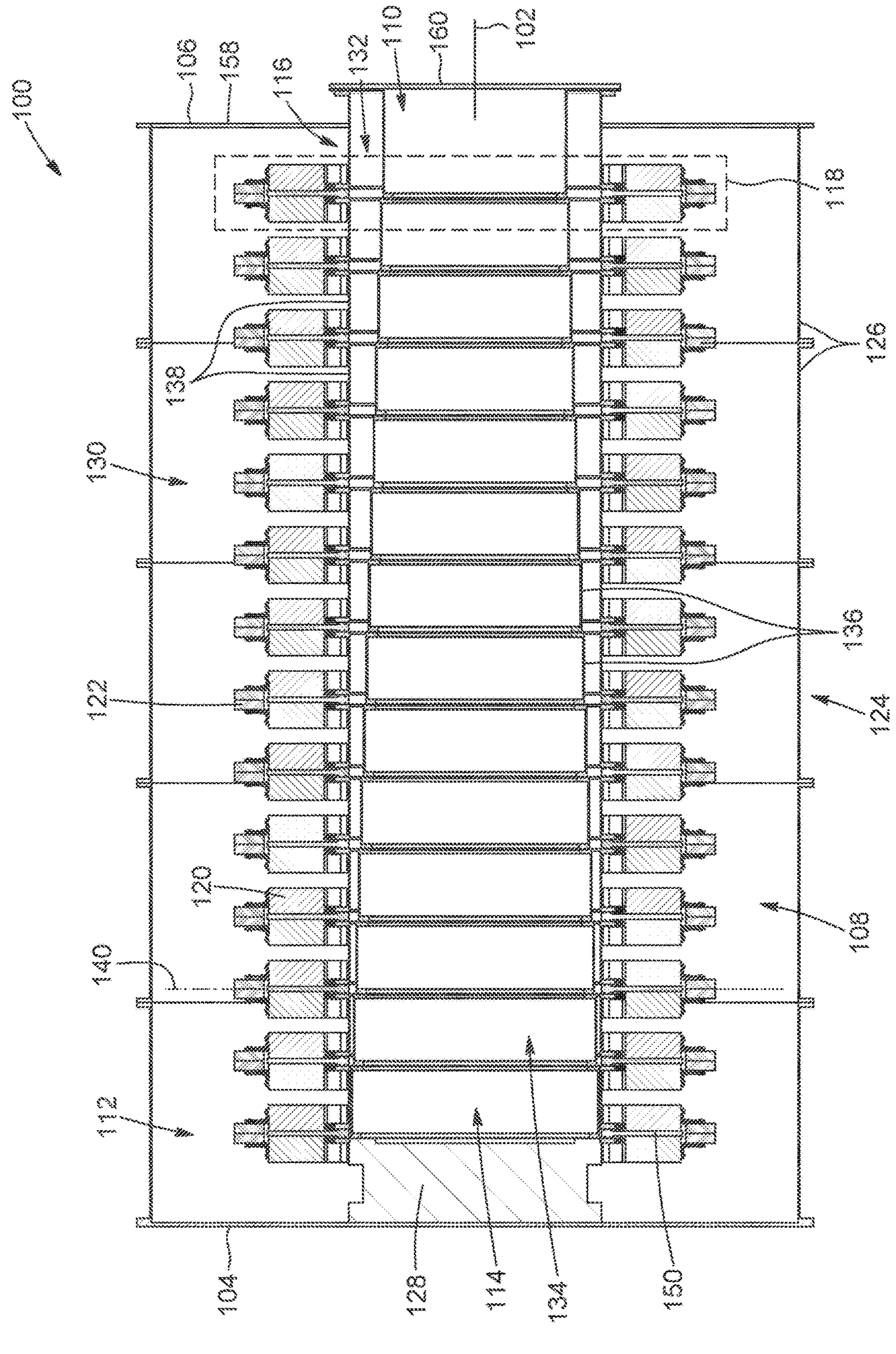
Figure 4:
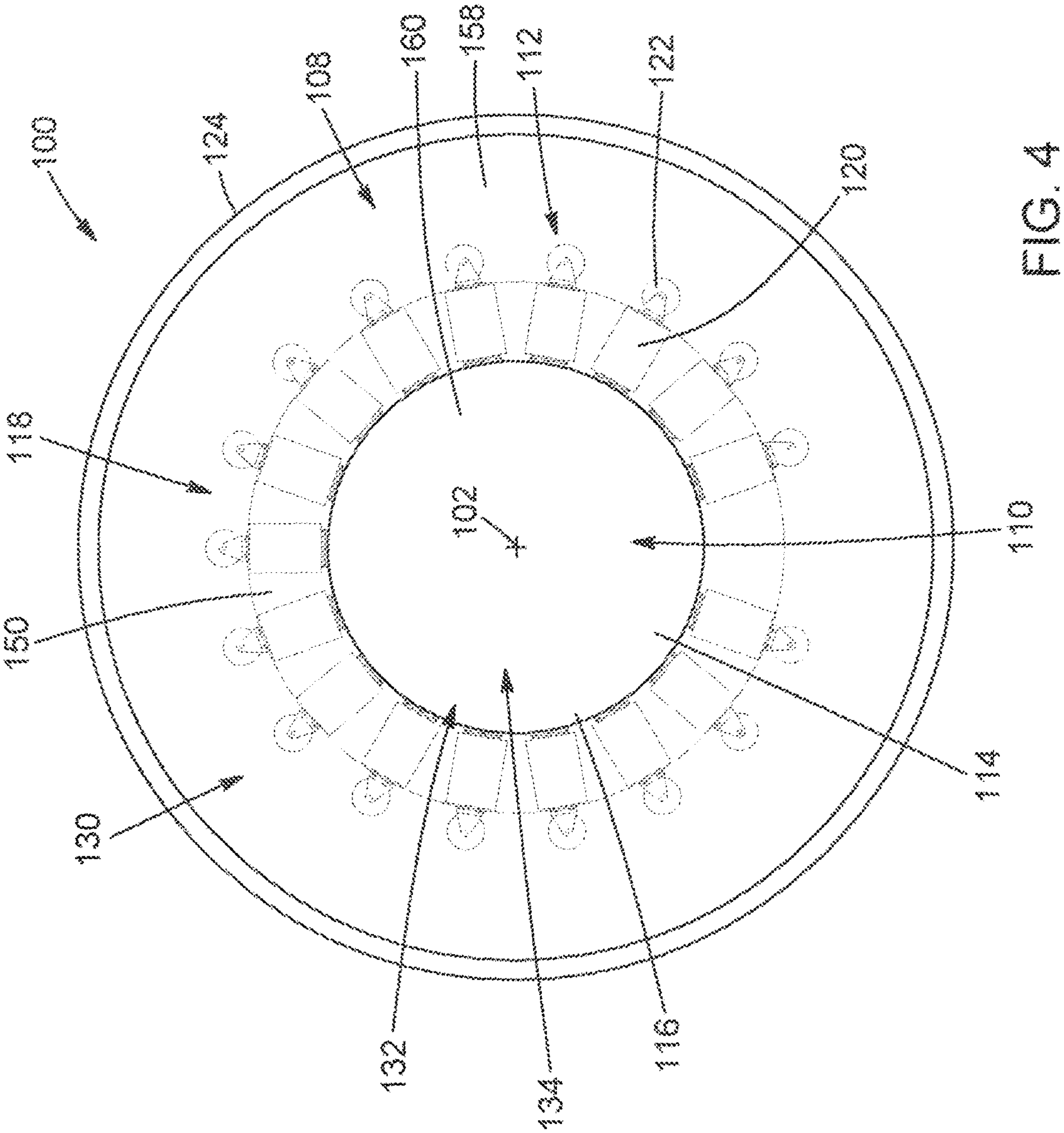

In the present disclosure, similar features in the drawings have been given similar reference numerals. To avoid cluttering certain figures, some elements may not be indicated if they were already identified in a preceding figure. The elements of the drawings are not necessarily depicted to scale since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element, unless a specific relationship is indicated.

The terms "a", "an", and "one" are defined herein to mean "at least one", that is, these terms do not exclude a plural number of elements, unless stated otherwise.

The term "plurality" includes two or more referents unless the content clearly dictates otherwise.

The term "or" is defined herein to mean "and/or", unless stated otherwise.

The expressions "at least one of X, Y, and Z" and "one or more of X, Y, and Z", and variants thereof, are understood to include X alone, Y alone, Z alone, any combination of X and Y, any combination of X and Z, any combination of Y and Z, and any combination of X, Y, and Z.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, fluidic, logical, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process but ends after the completion of the second process.

Unless defined otherwise, all technical and scientific terms used herein have the same meaning as commonly understood by one of ordinary skill in the art to which the disclosure pertains.

The present disclosure generally relates to IMG-based pulsed-power drivers and associated structures and methods. The disclosed embodiments of pulsed-power drivers have a modular construction and design. The modularity of the disclosed embodiments can provide advantages in terms of ease of assembly, disassembly, and maintenance operations, as well as in terms of providing configuration flexibility and scalability. It is appreciated that the basic theory, conceptual design, and operation of IMGs are generally known in the art and need not be described in detail herein other than to facilitate the understanding of the present techniques. Reference is made in this regard to the following reference: W. A. Stygar et al. "Impedance-match Marx generators", *Phys. Rev. Accel. Beams,* 20, 040402 (2017) (hereinafter "Stygar et al."), the content of which is incorporated herein by reference in its entirety. The techniques disclosed herein may be used in various fields and applications that require or benefit from fast-rising, high-power pulses. Non-limiting examples of potential fields and applications include, to name a few, inertial confinement fusion, pinch devices, wire-array implosion, plasma physics, radiation physics, astrophysics, flash X-ray sources, ultra-fast X-ray radiography, material under extreme conditions, and various other high-energy-density physics (HEDP) applications.

Various aspects and implementations of the present techniques are described below with references to the figures.

Referring to FIGS. 1 to 9, there are illustrated various schematic representations of an embodiment according to the present disclosure of a pulsed-power driver 100. The pulsed-power driver 100 can be used as a prime-power source for electrical pulse generation in various applications. The pulsed-power driver 100 has an IMG-based architecture. The pulsed-power driver 100 extends along a longitudinal driver axis 102 from an upstream end 104 to a downstream end 106. The pulsed-power driver 100 generally includes a voltage adder assembly 108 and a transmission line 110 that both extend along the driver (center) axis 102, with the voltage adder assembly 108 coaxially surrounding the transmission line 110. The terms "upstream" and "downstream" are defined herein as a function of the propagation direction of a forward traveling wave along the transmission line 110.

In the illustrated embodiment of FIGS. 1 to 9, the pulsed-power driver 100 is used (e.g., arranged) in a horizontal implementation, as defined by the driver axis 102 being horizontal, that is, oriented along a direction that is substantially perpendicular to the force of gravity (not shown in the figures).

Figure 12:
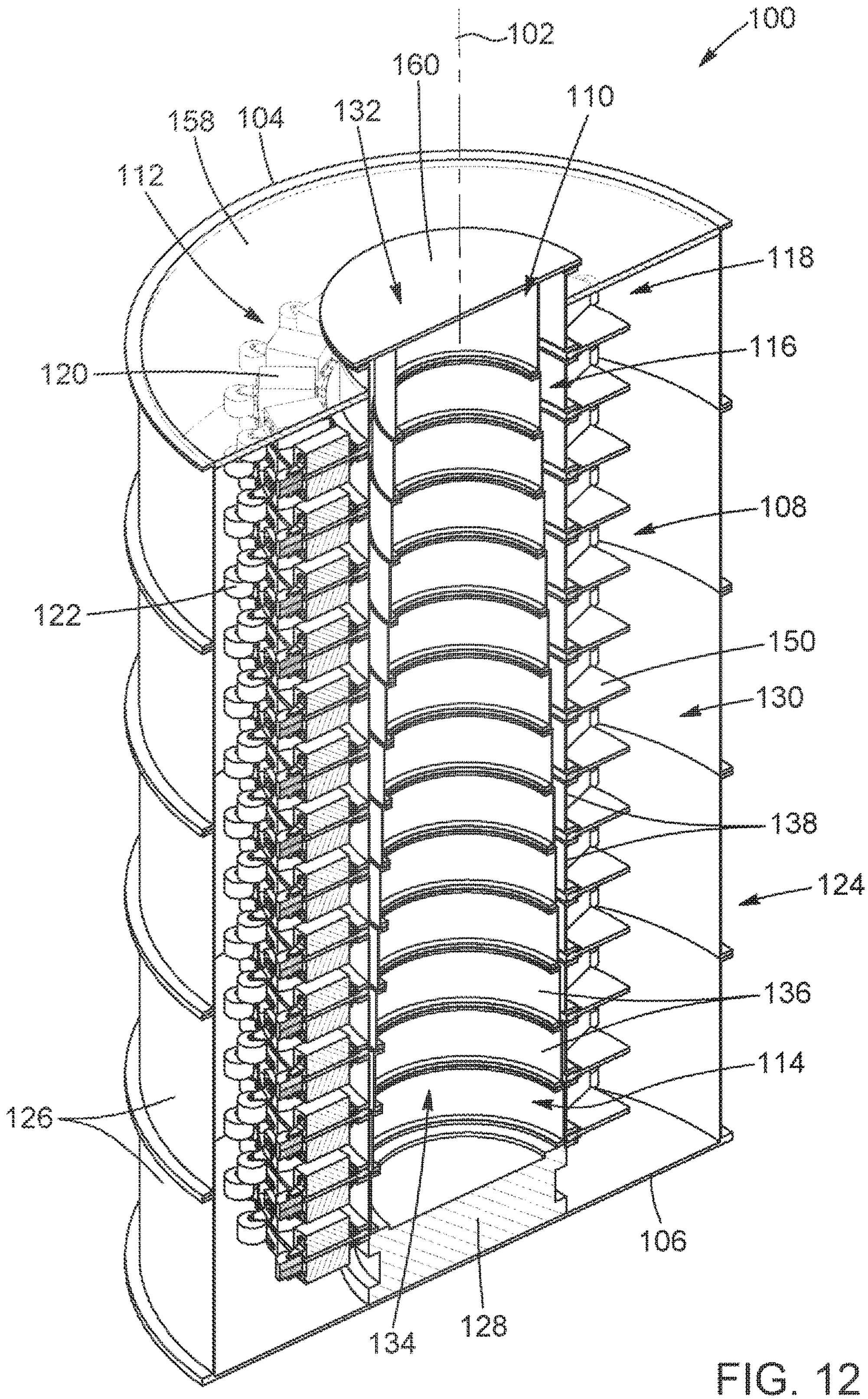

In other embodiments according to the present disclosure, the pulsed-power driver 100 can instead be used in a vertical implementation, in which the driver axis 102 is vertical, that is, oriented along a direction that is substantially parallel to the force of gravity. An embodiment of a pulsed-power driver 100 used in vertical implementation is depicted in FIGS. 12 and 13. It is noted that using embodiments of the pulsed-power driver 100 disclosed herein in a vertical implementation can be advantageous for assembly, disassembly, and maintenance purposes. One reason is that while the different components of the voltage adder assembly 108 and the transmission line 110 are stacked vertically one on top of the other during assembly or maintenance, the alignment (e.g., centering) of these components in the plane perpendicular to the driver axis 102 can be carried out without having to work against gravity, contrary to the case of a horizontal implementation where measures generally have to be taken to take into account gravitational forces and torques when performing such alignment operations. In addition to facilitating disassembly operations, the vertical implementation can also improve the pulsed-power driver's reliability and structural capability to withstand gravitational forces and torques during use, thereby providing a longer lifespan of the pulsed-power driver 100.

Returning to FIGS. 1 to 9, the voltage adder assembly 108 includes a plurality of pulse-forming circuits 112 electrically connected in series and parallel. The pulse-forming circuits 112—which can be referred to herein as "bricks"—represents the basic building blocks of the voltage adder assembly 108. Each brick 112 can be provided (e.g., represented) as an RLC drive circuit that can be triggered individually and designed to generate an (individual) electrical pulse having a specified temporal width as defined, for example, by its rise time and pulse width. The transmission line 110 includes an inner conductor 114 and an outer conductor 116 disposed in a coaxial arrangement. Both the inner conductor 114 and the outer conductor 116 have a modular segmented configuration along the driver axis 102. In operation, the voltage adder assembly 108 is configured to generate an electrical pulse from the plurality of individual pulses generated by triggering the plurality of bricks 112. The electrical pulse generated by the voltage adder assembly 108 is configured to drive the transmission line 110, and the transmission line 110 is in turn configured to drive a load (not shown in FIGS. 1 to 9; see FIGS. 10A and 10B, $Z_{load}$). Various types of loads can be used depending on the application. Non-limiting examples of possible loads include a dummy load, a liner load, a gas-puff Z-pinch, an X-pinch, a wire-array Z-pinch, a beam accelerator, low-inductance magnetic coils, an electron beam diode, a fusion load, and the like. In some embodiments according to the present disclosure, using an impedance-matched coaxial load can be desirable or advantageous.

In the disclosed embodiments, the transmission line 110 is impedance-matched to the voltage adder assembly 108 (e.g., on a stage-by-stage basis) in that the longitudinal profile of the impedance of the transmission line 110 along the driver axis 102 is matched to that of the voltage adder assembly 108. The adjustment of the longitudinal profile of the impedance of the transmission line 110 is achieved by providing the inner conductor 114 with a longitudinally tapered configuration (e.g., stepped or linearly tapered).

More details regarding the structure, configuration, and operation of these components and other possible components of the pulsed-power driver 100 according to the present disclosure are provided below. It is appreciated that FIGS. 1 to 9 are simplified schematic representations that illustrate certain features and components of the pulsed-power driver 100, such that additional (e.g., auxiliary) features and components that may be useful or necessary for its practical operation may not be specifically depicted. Non-limiting examples of such additional features and components can include, to name a few, power supplies, electrical connections, gas sources and supply lines, pressure and flow control devices, temperature control devices, triggering systems, oil and deionized water processing systems, operation monitoring and diagnostic devices, processors and controllers, and other types of hardware and equipment.

In the illustrated embodiment of FIGS. 1 to 9, the bricks 112 are arranged in a number of stages 118 of the voltage adder assembly 108. The stages 118 are axially distributed along the driver axis 102 and electrically connected to one another in series. Each stage 118 includes a number of bricks 112 that are azimuthally distributed about the driver axis 102 and electrically connected to one another in parallel. In the illustrated embodiment, and according to an exemplary embodiment of the present disclosure, the voltage adder assembly 108 includes 14 stages 118, and each stage 118 includes 17 bricks 112, for a total of 238 bricks 112. In other embodiments according to the present disclosure, these numbers can be different. For example, in some embodiments according to the present disclosure, the number of stages 118 can range from 1 to about 100, the number of bricks 112 per stage can range from 1 to about 100, and the total number of bricks 112 can range from 1 to about 104. The number stages 118 and the number of bricks 112 per stage can be selected based on various factors, including the desired or required load impedance, the peak current, and the peak voltage. In some embodiments, the number of bricks 112 can be different across the stages 118. In the illustrated embodiment, the azimuthal separation between adjacent ones of the bricks 112 within each stage 118 is equal to 20° (except between the first one and the last one, which are separated by 40°). Less symmetrical arrangements of the bricks 112 within each stage 118 are possible in other embodiments according to the present disclosure. In the illustrated embodiment, the longitudinal separation between corresponding (centerlines of) bricks 112 in adjacent stages 118 is the same for all the pairs of adjacent stages 118, although this is not a requirement. In some embodiments, the longitudinal separation between adjacent stages 118 can range from about 5 cm to about 100 cm. In the illustrated embodiment, the number and arrangement of the brick 112 within each stage 118 are the same for all of the stages 118, although neither is a requirement.

In the illustrated embodiments of FIGS. 1 to 9, each brick 112 includes a pair of capacitors 120 and a single switch 122 electrically connected in series. In other words, each of the two terminals of the switch 122 that establish a current path through the switch 122 is connected to a terminal of a respective capacitor of the pair of capacitors 120. Other embodiments according to the present disclosure using other configurations of RLC pulse-forming circuits for the bricks may be envisioned, for example, bricks including a single capacitor, instead of a pair, in series connection with a switch. In the illustrated embodiment, the bricks 112 are all identical to one another, but this is not a requirement.

In some embodiments according to the present disclosure, the capacitors 120 can include any high-voltage, low-inductance, and fast-rise-time capacitors that are suitable for use in pulsed-power applications. In some embodiments according to the present disclosure, the capacitors 120 can have a capacitance ranging from about 1 nF to about 1000 nF, a charging voltage ranging from 1 kV to 200 kV, and an inductance ranging from about 80 nH to about 300 nH. According to an exemplary embodiment of the present disclosure, the capacitors 120 can be 100-kV-80-nF capacitors. Depending on the application, the capacitors 120 in each brick 112 may or not may not be identical to each other, and likewise for capacitors 120 in different bricks 112.

In some embodiments according to the present disclosure, the switch 122 can include any suitable switch configured or suitable for use in pulsed-power applications, for example, a high-voltage, low-inductance switch. According to an exemplary embodiment of the present disclosure, the switch 122 can be a field-distortion gas switch, such as, for example, a 200-kV field-distortion gas switch.

Referring still to FIGS. 1 to 9, according to an embodiment of the present disclosure, the pulsed-power driver 100 includes an enclosure 124 configured to contain the voltage adder assembly 108 and the transmission line 110. The enclosure 124 may be embodied by any suitable housing or vessel. In some embodiments, the enclosure 124 may be provided as a cylindrical (e.g., tubular) tank extending between the upstream end 104 and the downstream end 106 to enclose the voltage adder assembly 108 and the transmission line 110 in a coaxial arrangement with respect to the driver axis 102. Other configurations may be used in other embodiments. In some embodiments according to the present disclosure, the enclosure 124 may be made of stainless steel or another suitable material. In some embodiments according to the present disclosure, the enclosure 124 may have a length ranging from about 20 cm to about 20 m and a radius ranging from about 10 cm to about 5 m, although other enclosure dimensions may be used in other embodiments. In some embodiments according to the present disclosure, the enclosure 124 can include a plurality of (separate) enclosure segments 126 along its length. For example, in the illustrated embodiments of FIGS. 1 to 9, the enclosure 124 includes five enclosure segments 126. The enclosure segments 126 may be joined together using suitable fasteners, for example, bolted flanged connections with gaskets as sealing elements. Providing the enclosure 124 with such modular arrangement according to the present disclosure can be advantageous in terms of design scalability and ease of assembly and disassembly. It is appreciated that depending on the application, the number of enclosure segments 126 may or may not be the same as the number of stages 118 of the voltage adder assembly 108. The enclosure 124 may have a suitable cover or lid (not shown) provided at each one of the upstream and downstream ends 104, 106.

In the illustrated embodiment of FIGS. 1 to 9, the outer conductor 116 encloses the inner conductor 114 in a coaxial arrangement with respect to the driver axis 102. Both the inner conductor 114 and the outer conductor 116 have a substantially tubular configuration with a circular cross-section transverse to the driver axis 102. Other configurations may be used in other embodiments, including non-coaxial arrangements and arrangements with non-circularly symmetric transverse cross-sections. In the illustrated embodiment, the inner conductor 114 extends in a substantially tapered configuration from the upstream end 104 to the downstream end 106, while the outer conductor 116 extends in a substantially straight cylindrical configuration from the upstream end 104 to the downstream end 106. In other words, for the illustrated embodiment, a radius/diameter of the circular cross-section of the inner conductor 114 decreases from the upstream end 104 to the downstream end 106, whereas a radius/diameter of the circular cross-section of the outer conductor 116 remains substantially constant from the upstream end 104 to the downstream end 106.

In some embodiments according to the present disclosure, and as illustrated in FIGS. 1 to 9, the pulsed-power driver 100 may include an insulator stand 128 at the upstream end 104, to which the inner conductor 114 and the outer conductor 116 are connected. The insulator stand 128 can provide electrical insulation and structural alignment between the enclosure 124 and both the stages 118 and the transmission line 110. The insulator stand 128 may be made of a cylindrical piece of insulating material. Non-limiting examples of possible insulating materials include glass-epoxy composite materials (e.g., G11 glass-epoxy laminates), high-density polyethylene (HDPE), polytetrafluoroethylene (PTFE), polycarbonate, acrylic, and Rexolite®. Returning briefly to FIGS. 12 and 13A, in vertical implementations, the insulator stand 128 can provide a base or support structure upon which the various components of the voltage adder assembly 108 and the transmission line 110 can be mounted and rest. In horizontal implementations, the insulator stand 128 may also provide a base or support structure for other components (e.g., the voltage adder assembly 108 and the transmission line 110) of the pulsed-power driver 100.

With continued reference to FIGS. 1 to 9, in some embodiments according to the present disclosure, the inner conductor 114 and the outer conductor 116 may each have a length ranging from about 40 cm to about 20 m, the inner conductor 114 may have a radius ranging from about 4.5 cm to about 4.5 m at the upstream end 104 and from about 4 cm to about 4 m at the downstream end 106, and the outer conductor 116 may have a radius ranging from about 5 cm to about 5 m. Other inner and outer conductor dimensions may be used in other embodiments. The inner conductor 114 and the outer conductor 116 may each be made of any suitable electrically conductive material, such as various metals and metal alloys. It is appreciated that the size, shape, composition, structure, and arrangement of the inner conductor 114 and the outer conductor 116 can be varied depending on the application.

In the illustrated embodiment of FIGS. 1 to 9, the pulsed-power driver 100 includes an oil section 130, a deionized water section 132, and an air section 134, where the oil section 130 surrounds the deionized water section 132, which in turn surrounds the air section 134. The oil section 130 corresponds to the region/volume inside the enclosure 124 but outside the outer conductor 116. The oil section 130 is filled with oil (e.g., transformer oil or another type of high-dielectric-strength oil) and contains the voltage adder assembly 108. One purpose of the oil section 130 is to prevent any unwanted surface discharges (e.g., corona and arc discharge) around the electrical components of the voltage adder assembly 108 (e.g., resistors, capacitors, inductors, switches, conductors, connections). Providing the oil section 130 can help in making the overall setup of the pulsed-power driver 100 more compact. The deionized water section 132 corresponds to the region/volume inside the outer conductor 116 but outside the inner conductor 114. The deionized water section 132 is filled with deionized water (e.g., deionized water due to its high dielectric constant), which is continuously recirculated in operation of the pulsed-power driver 100 (e.g., to avoid unwanted surface impurity deposition). One purpose of the deionized water section 132 is to act as a dielectric medium between the inner conductor 114 and the outer conductor 116 of the transmission line 110. The air section 134 corresponds to the region/volume inside the inner conductor 114. The air section 134 can be at atmospheric pressure or any other suitable reduced or increased pressure. In other embodiments, the region inside the inner conductor 114 can be filed with oil or deionized water, or another suitable material/fluid. In yet other embodiments, the inner conductor 114 may be a solid piece material, instead of a hollow tube. It is appreciated that providing the inner conductor 114 as a hollow tube filed with, for example, air, can be advantageous for weight reduction purposes.

With further reference to FIGS. 1 to 9, in some embodiments according to the present disclosure, the transmission line 110 has a modular segmented configuration along the driver axis 102, in that the inner conductor 114 includes a plurality of inner conductor segments 136 and the outer conductor 116 includes a plurality of outer conductor segments 138. In the illustrated embodiment, the upstream-most of the inner and outer conductor segments 136, 138 are connected to the (electrical) insulator stand 128, and the downstream-most of the inner and outer conductor segments 136, 138 are (electrically) insulated from each other by a suitable insulator 158, such as HDPE, PTFE, polycarbonate, acrylic, or Rexolite®. The downstream-most of the outer conductor segments 138 can be connected to the enclosure 102 via a conductive flange 160 or another suitable electrically conducting connection. The downstream-most of the inner and outer conductor segments 136, 138 can be connected to a load (not shown) downstream of the insulator. In the illustrated embodiment, the inner conductor 114 include 14 inner conductor segments 136, and the outer conductor 116 includes 14 outer conductor segments 138. In other embodiments, these numbers can be varied. For example, in some embodiments, the number of inner conductor segments 136 and the number of outer conductor segments 138 can each range from 2 to about 100, noting that the number of inner conductor segments 136 need not be the same as the number of outer conductor segments 138.

In the illustrated embodiment of FIGS. 1 to 9, all the inner conductor segments 136 have the same length, and likewise for all the outer conductor segments 138. In such a configuration, the transition point between any pair of adjacent inner conductor segments 136 is longitudinally aligned with the transition point between the corresponding pair of adjacent outer conductor segments 138. These longitudinally aligned inner and outer transition points can be said to define a set of conductor-segment transition planes 140 (e.g., there are 13 conductor segments transition planes in the illustrated embodiment, each such transition plane 140 being orthogonal to the driver axis 102). In other embodiments, however, the inner conductor segments 136 need not all have the same length, and/or the outer conductor segments 138 need not all have the same length, and/or the number of inner conductor segments 136 need not be the same as the number of outer conductor segments 138.

According to an embodiment of the present disclosure, and as illustrated in FIGS. 1 to 9, each of the inner conductor segments 136 is provided as a cylinder tube of constant radius, and the radii of the inner conductor segments 136 decrease in a stepwise manner from the upstream-most to the downstream-most of the inner conductor segments 136, so as to provide the inner conductor 114 with a stepped tapered profile for impedance-matching purposes. It is appreciated that in other embodiments according to the present disclosure, the inner conductor 114 may have a smooth tapered profile (e.g., a linear tapered profile). In such case, the individual inner conductor segments 136 may have a frustoconical shape rather than a cylindrical/tubular shape. In the illustrated embodiment of FIGS. 1 to 9, the outer conductor segments 138 are provided as cylinder tubes having all the same radius.

In the illustrated embodiment of FIG. 1 to 9, the number of inner and outer conductor segments 136, 138 is the same as the number of stages 118 of the voltage adder assembly 108. In this arrangement, each one of the stages 118 is longitudinally aligned with a corresponding one of the conductor-segment transition planes 140 (except for the upstream-most of the stages 118, which is longitudinally aligned with the connection/plane between the insulator stand 128 and the upstream-most of the inner and outer conductor segments 136, 138). It is appreciated that longitudinally segmenting of the inner conductor 114 and the outer conductor 116 according to the present teachings to provide the transmission line 110 with a modular design that matches the modular division of the voltage adder assembly 108 into a longitudinal distribution of stages 118 can be advantageous in terms of improving ease and reducing cost and time of assembly and maintenance operations.

In some embodiments according to the present disclosure, the coupling between each pair of adjacent inner conductor segments 136 is configured to provide a connection that is mechanically strong (e.g., to withstand any stress exerted during operating conditions of the pulsed-power driver 100), hermetically sealed (e.g., to prevent water leakage between the deionized water section 132 and the air section 134), and readily/easily disconnected and/or reconnected (e.g., to ease assembly, disassembly, and maintenance operations). It is appreciated that various types of sealed mechanical joints or connections can be used for this purpose. For example, in the illustrated embodiment (see more specifically FIGS. 6 and 7), each pair of inner conductor segments 136 are connected to each other using a sealed mechanical connection 142 that includes a plurality of azimuthally spaced bolts 144 (e.g., compression bolt) and at least one gasket 146 (or O-rings), which together can provide a durable and leak-tight joint. The bolts 144 can act as mechanical fasteners that join together flanged ends of the inner conductor segments 136, while the gasket 146 can be inserted into a groove formed in one or both of the inner conductor segments 136 to provide a hermetic seal. Other types of sealed mechanical connections can be used in other embodiments, for example, compression sheets or sealing glue.

Figure 8:
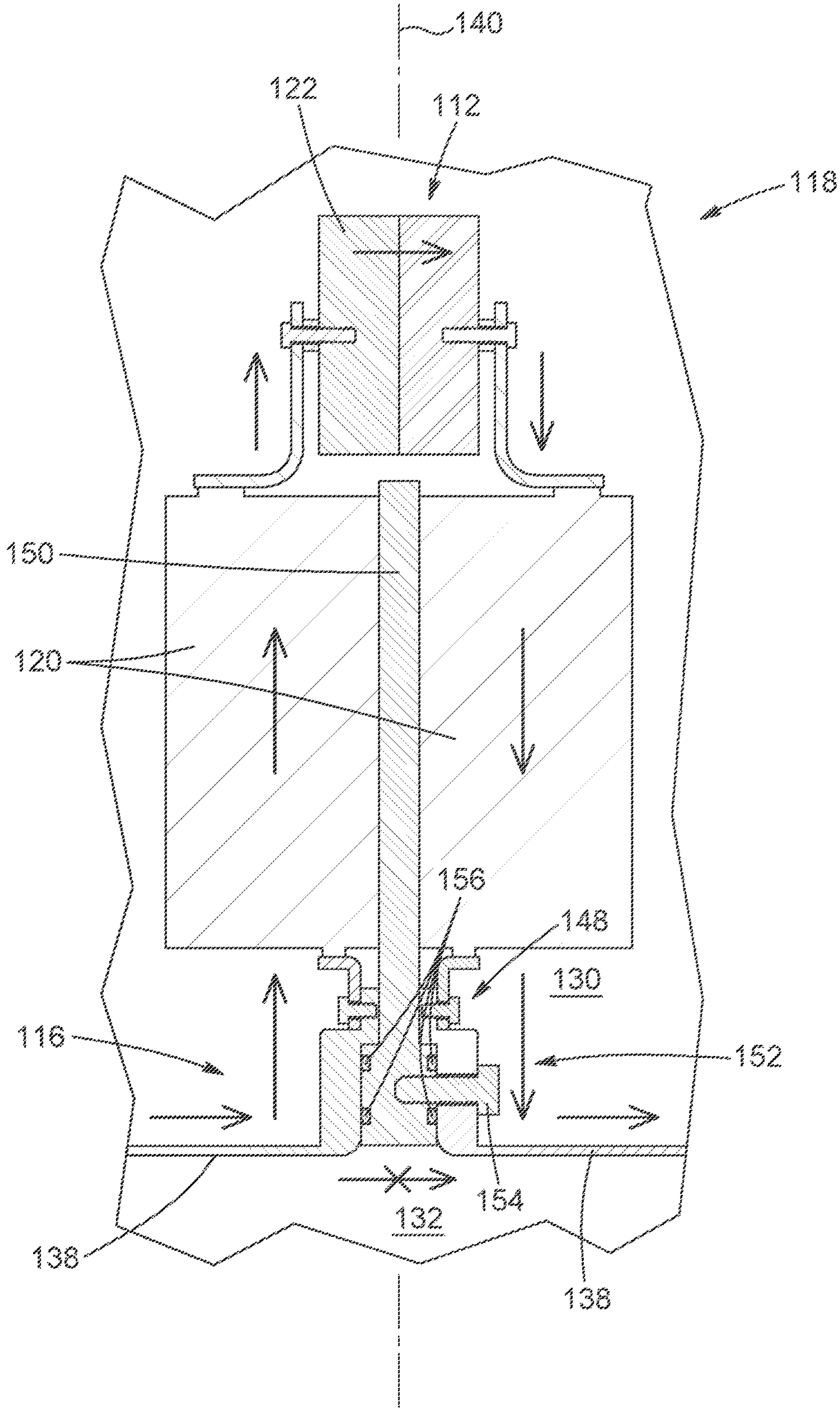
Figure 9:
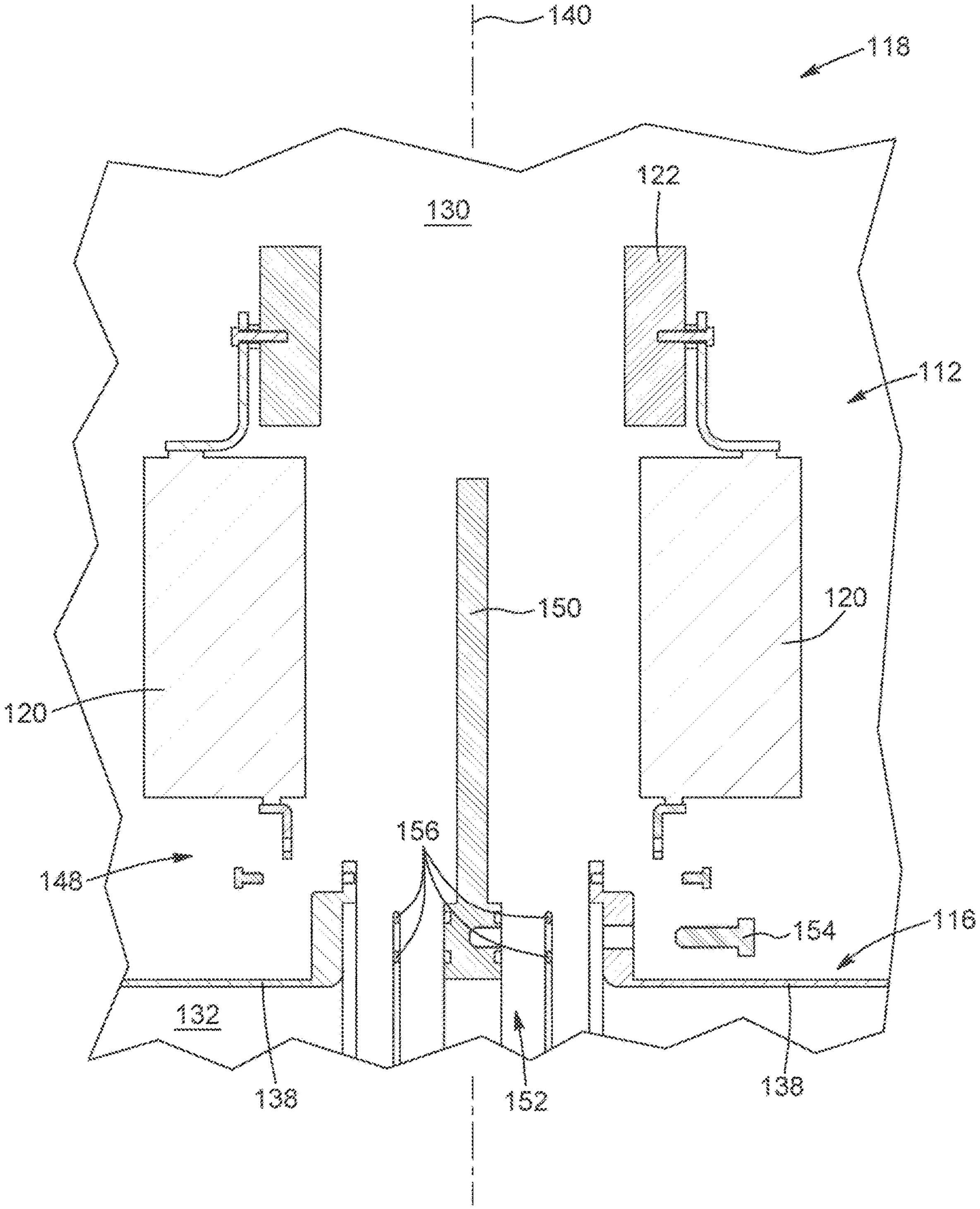

In the illustrated embodiment according to the present disclosure, the coupling between each pair of adjacent outer conductor segments 138 is configured to provide a connection that is mechanically strong, hermetically sealed (e.g., to prevent fluid leakage between the oil section 130 and the deionized water section 132), and readily/easily disconnected and reconnected. Referring more specifically to FIGS. 8 and 9, the coupling between each pair of adjacent outer conductor segments 138 is configured to ensure that the path of the electrical current that flows along the outer conductor 116 between the upstream end 104 and the downstream end 106 passes through each stage 118 of the voltage adder assembly 108. The solid arrows in FIG. 8 depict a current path that goes from an upstream outer conductor segment 138 (left outer conductor segment 138 in FIG. 8) to a downstream outer conductor segment 138 (right outer conductor segment 138 in FIG. 8) by passing successively through an upstream capacitor of the pair of capacitors 120, the switch 122 of the brick 112, and a downstream capacitor of the pair of capacitors 120, where suitable electric connections or leads 148 are provided to electrically connect the upstream outer conductor segment 138 to the terminals of the upstream capacitor 120 (left capacitor 120 in FIG. 8) and the downstream conductor segment 138 to the terminals of the downstream capacitor 120 (right capacitor 120 in FIG. 8).

According to an embodiment of the present disclosure, the pulsed-power driver 100 can include a plurality of annular-shaped stage insulators 150, one for each stage 118, which are longitudinally interleaved between each pair of adjacent outer conductor segments 138 and between the upstream-most outer conductor segment 138 and the insulator stand 128. In other words, as can be seen in FIG. 8, the stage insulator 150 of the stage 118 can include the corresponding transition plane 140. As can be seen in FIG. 8, each stage 118 of the voltage adder assembly 108 straddles the transition plane 140 between a corresponding pair of adjacent outer conductor segments 138, with one capacitor 120 of each brick 112 located upstream of the transition plane 140, the other capacitor 120 of each brick 112 located downstream of the transition plane 140, and the switch 122 of each brick 112 extending on both sides of the transition plane 140. Accordingly, the voltage adder assembly 108 and each brick 112 can be said to provide a substantially symmetrical arrangement about the transition plane 140. It is appreciated that without the provision of the stage insulators 150 between the two outer conductor segments 138 depicted in FIG. 8 (i.e., if the two outer conductor segments 138 were in direct contact with each other), a significant portion, if not nearly all, of the current would flow between the two outer conductor segments 138 without passing through the stage 118 (see the crossed arrow in FIG. 8, which represents the current path that is blocked by the stage insulator 150). The stage insulators 150 can be made of any suitable insulating material, for example, acrylic, polycarbonate, Rexolite®, plexiglass, and the like. In the illustrated embodiment, each stage insulator 150 has an inner radius that corresponds to the radius of the outer conductor 116, and an outer radius that is sufficiently large for the stage insulator 150 to extend between the two capacitors 120 of each brick 112 over the entire height of the capacitors 120 (e.g., such that the outer edge of each stage insulator 150 terminates close to the switches 122 of the corresponding stage 118—see FIGS. 8 and 9). In this case, the stage insulators 150 can be used not only to ensure that the stage 118 is not bypassed by the current flow, but also to provide a stand or base structure for supporting the capacitors 120. According to other embodiments of the present disclosure, both the inner radius and the outer radius of the stage insulators 150 may be of the order of the radius of outer conductor 116, in which case the stage insulators 150 may not be used for providing structural support to the bricks 112.

Figure 5:
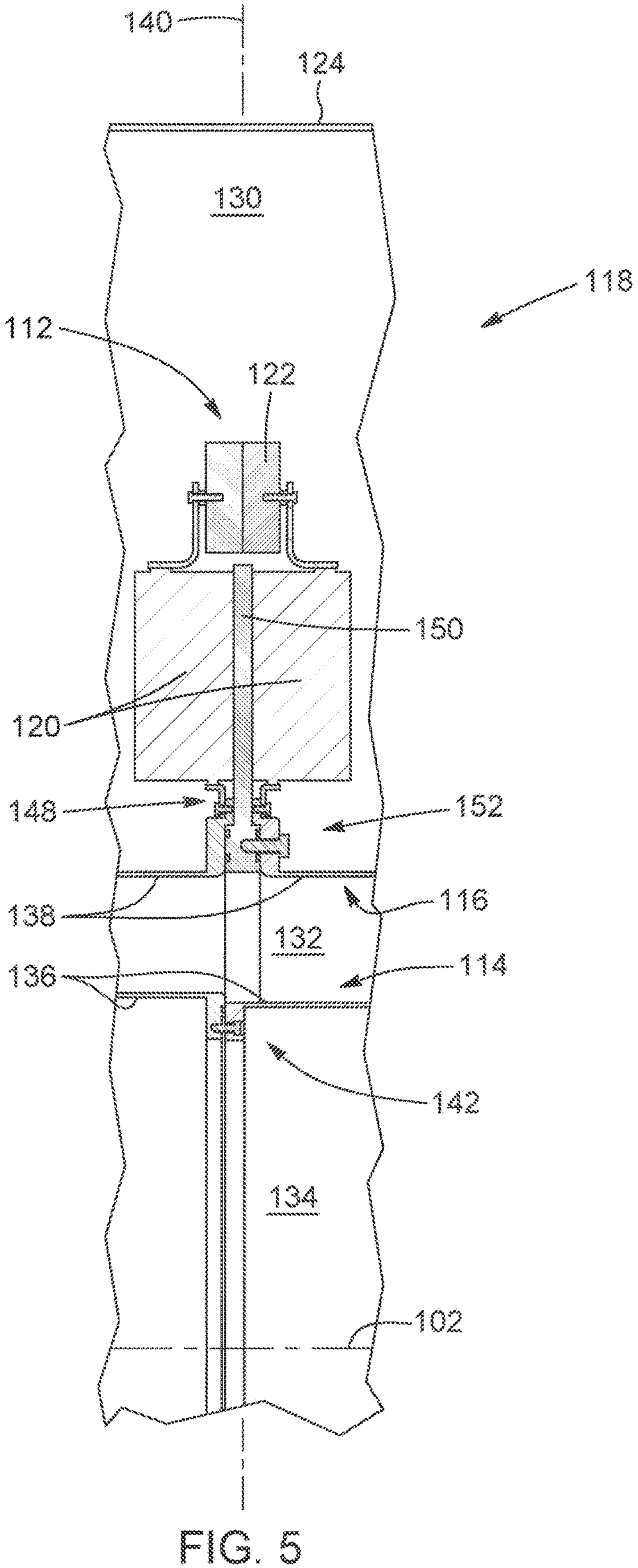
Figure 6:
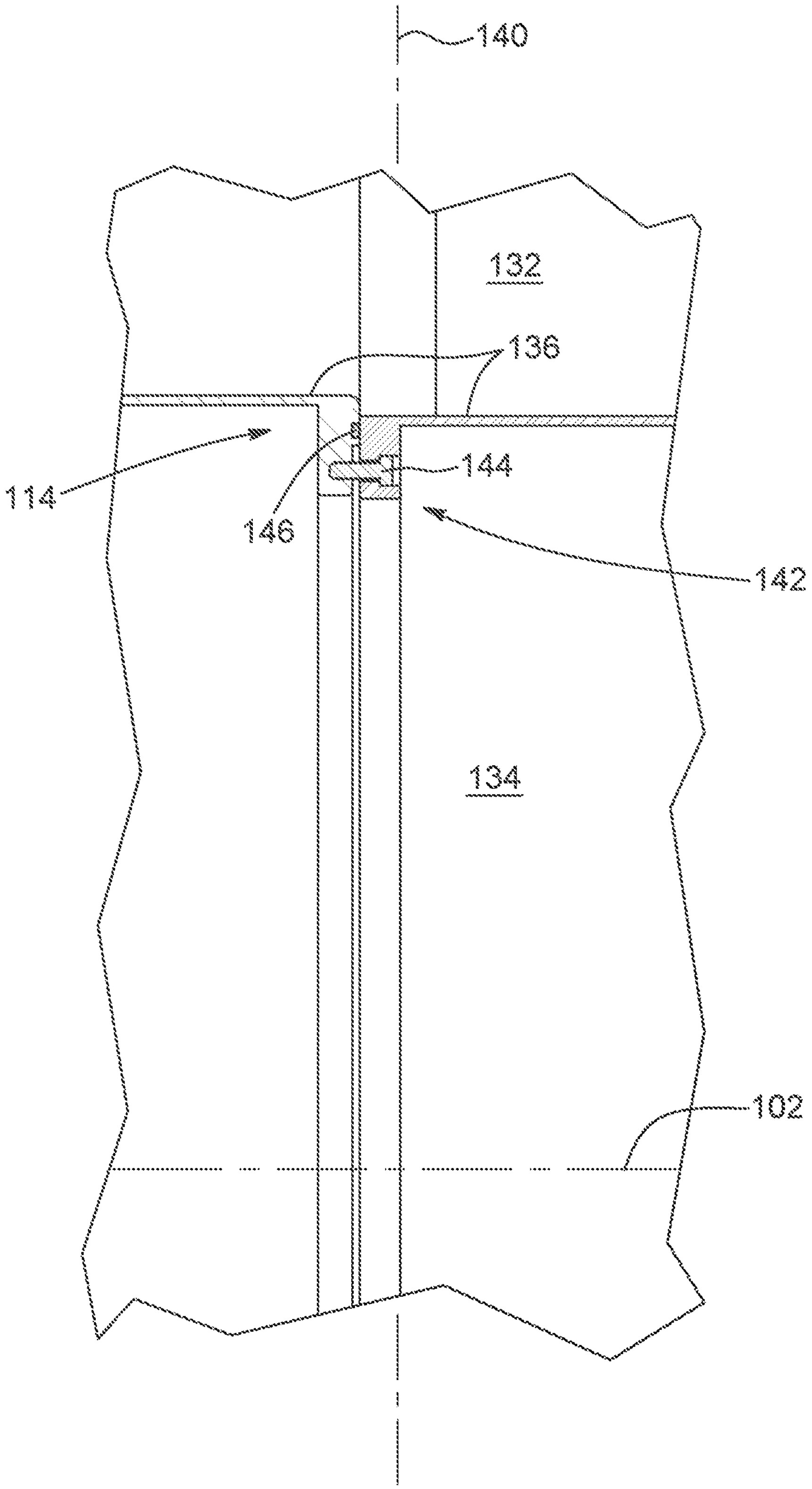
Figure 7:
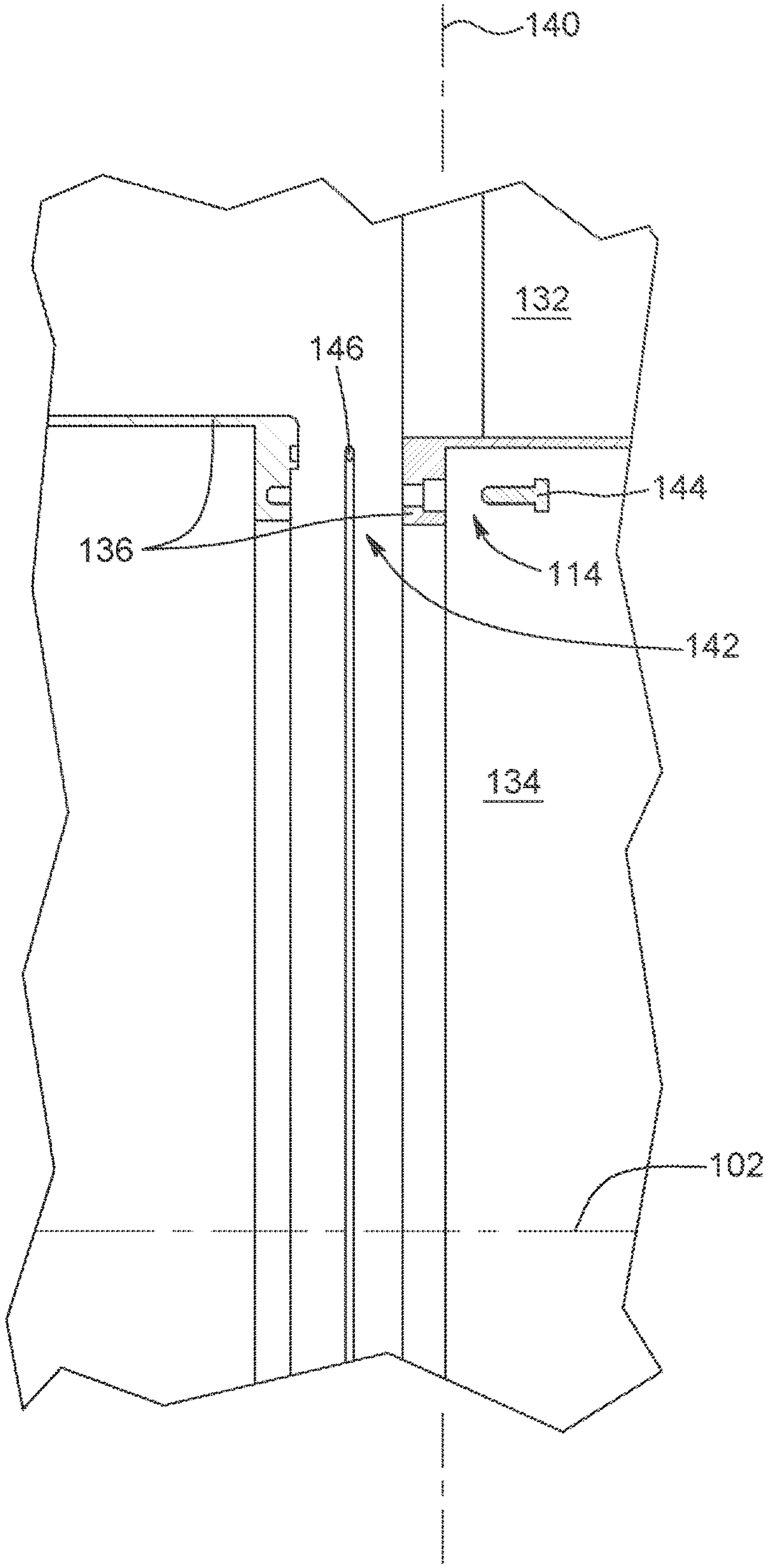

It is appreciated that various types of sealed mechanical joints or connections can be used for coupling the outer conductor segments 138 with the stage insulators 150 interleaved between them. For example, in the illustrated embodiment (see more specifically FIGS. 8 and 9), a sealed mechanical connection 152 is used that includes a plurality of azimuthally spaced bolts 154 (e.g., compression bolts) and a set of gaskets 156 (or O-rings), which together can provide a durable and leak-tight joint. The bolts 154 can act as mechanical fasteners that join a flanged end of each outer conductor segment 138 to the stage insulator 150, while the gaskets 156 (e.g., four gaskets 156 are depicted in FIGS. 8 and 9) can be inserted into grooves formed on both sides of the stage insulators 150 (e.g., two gaskets on each side in FIGS. 8 and 9). Other types of sealed mechanical connections can be used in other embodiments, for example, compression sheets and sealing glue. It is noted that although the longitudinal cross-sectional views depicted in FIGS. 5, 8, and 9 illustrate only a bolt 154 at the downstream side of the connection (e.g., connecting the right outer conductor segment 138 in FIGS. 5, 8, and 9 to the stage insulator 154), bolts 154 can also be provided at the upstream side of the connection (e.g., e.g., connecting the left outer conductor segment 138 in FIGS. 5, 8, and 9 to the stage insulator 154) but at different azimuthal positions so they are not visible in FIGS. 5, 8, and 9.

Figure 10A:
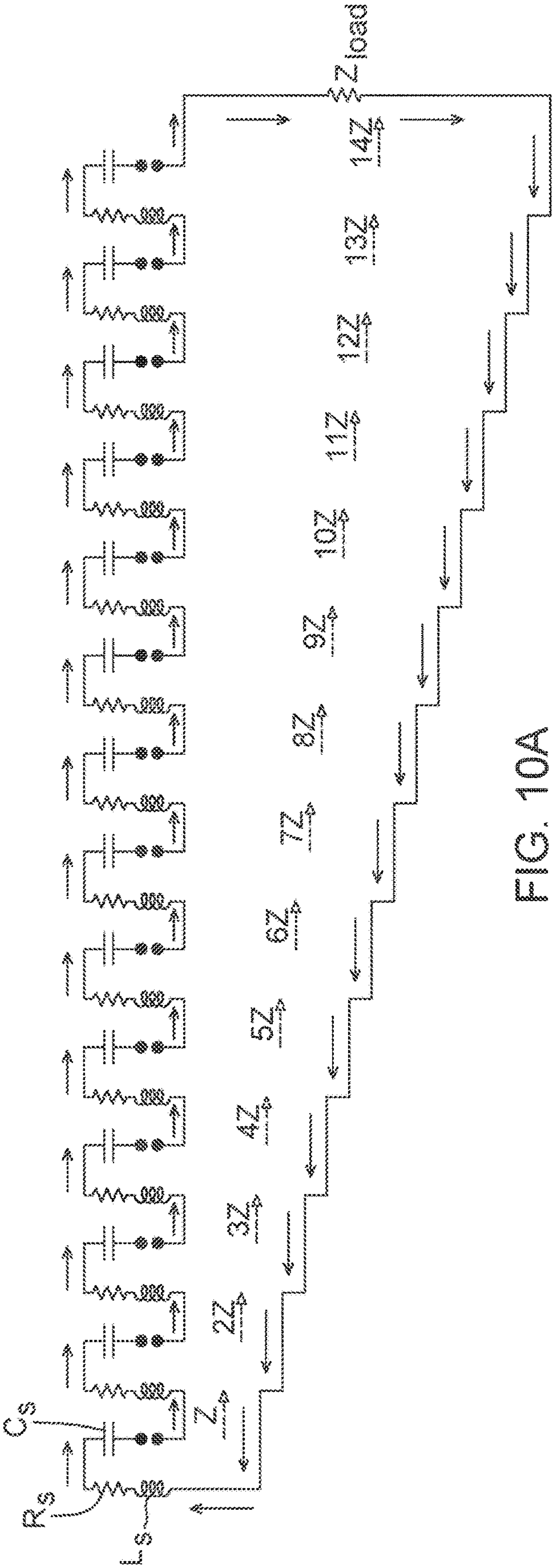
FIG. 10A shows a schematic representation of a circuit model of the pulsed-power driver of FIG. 1.
Figure 10B:
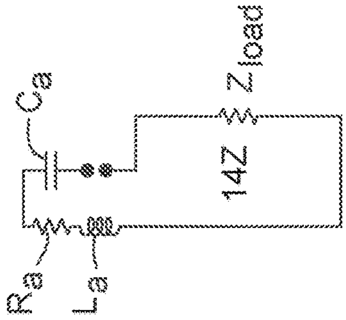
FIG. 10B shows a schematic representation of an equivalent circuit model of the pulsed-power driver of FIG. 1.

Together with FIGS. 1 to 9, operation of the pulsed-power driver 100 according to the present disclosure is described with further reference to FIG. 10A and FIG. 10B. In particular, FIG. 10A shows a schematic representation of a circuit model of the pulsed-power driver 100, the circuit model provided by a series connection of a plurality (e.g., 14) of individual RLC circuits corresponding to the plurality (e.g., 14) of stages 118, each including a plurality of bricks 112. As shown in FIG. 10A, each of the individual RLC circuits can be represented by a series connection of an inductance, $L_S$, (e.g., effective series inductance of a stage 118), a resistance, $R_S$, (e.g., effective series resistance of the stage 118), and a capacitance, $C_S$, (e.g., effective series capacitance of the stage 118), with respective values provided, for example, via parameters (e.g., corresponding to capacitors 120 and switch 122) of the corresponding plurality of bricks 112. Furthermore, each output (shown in FIG. 10A as two dots) of an individual RLC circuit ($L_S$, $R_S$, $C_S$) is matched to an impedance (e.g., Z, 2Z, . . . , 14Z) it sees, such impedance provided by respective segments of the transmission line 110 (e.g., via the gap between the inner conductor 114 and the outer conductor 116). Also shown in FIG. 10A is a load, $Z_{load}$, coupled to the output of the pulsed-power driver 100 driven by the transmission line 110. An equivalent circuit of the circuit model of FIG. 10A is shown in FIG. 10B, with $La=10\times L_S$, $Ra=10\times R_S$, and $Ca=10^{-1}\times C_S$. More details regarding the basic operation of IMG-based pulsed-power drivers can be found in Stygar et al. The circuit model of FIG. 10A assumes that (i) all the bricks 112 of the voltage adder assembly 108 are identical, (ii) all the bricks 112 within a stage 118 are triggered simultaneously, and (iii) each brick 112 can be modeled as an RLC circuit with capacitance $C_b$, inductance $L_b$, and resistance $R_b$.

Tables I to III are provided below. Table I lists exemplary values of certain parameters of a brick 112 that includes a pair of 100-kV-80-nF capacitors 120 and a 200-kV field-distortion gas switch 122. Based on these parameter values, the brick 112 according to the present teachings can be configured to generate a 5-GW discharge power. Table II lists exemplary values of certain parameters of a stage 118 including 17 bricks having the brick parameter values listed in Table I, while Table III lists exemplary values of certain parameters of a voltage adder assembly 108 including 14 stages having the stage parameter values listed in Table II. A pulsed-power driver 100 according to the present teachings provided with a voltage adder assembly 108 having the parameter values listed in Table III can be configured to deliver a peak electrical power of 1 TW to a 2-Ω impedance-matched load (e.g., $Z_{load}$ of FIGS. 10A-10B). It is appreciated that by varying the number of stages, the number of bricks per stage, and the individual brick parameters (e.g., brick capacitance, inductance, and impedance), the pulsed-power driver 100 according to the present teachings can be impedance-matched to a broad range of load impedance values.

TABLE I

Brick parameters, in accordance with an exemplary embodiment.

| Brick Parameter | Value |
|---|---|
| $C_b$ | 40 nF |
| $L_b$ | 160 nH (assumption) |
| LC time constant | 80 ns |
| $R_b$ | 0.3 Ω (assumption) |
| $U_{b(100\ kV)} = \frac{1}{2} C_b V_b^2$ | 800 J |
| $Z_b = 1.1\sqrt{\frac{L_b}{C_b}} + 0.8\ R_b$ | 2.44 Ω |

TABLE II

Parameters of a stage including 17 bricks having the parameter values listed in Table I.

| Stage Parameter | Value |
|---|---|
| $C_s = n_b C_b = 17C_b$ | 680 nF |
| $L_s = L_b/n_b = L_b/17$ | 9.41 nH |
| $R_s = R_b/n_b = R_b/17$ | 0.0176 Ω |
| $U_{s(100\ kV)} = n_b U_b = 17U_b$ | 13.6 kJ |
| $Z_s = 1.1\sqrt{\frac{L_s}{C_s}} + 0.8\ R_s = \frac{Z_b}{n_b} = \frac{Z_b}{17}$ | 0.144 Ω |

TABLE III

Parameters of a voltage adder assembly including 14 bricks having the parameter values listed in Table II.

| Assembly Parameter | Value |
|---|---|
| $C_a = C_s/n_s = C_s/14$ | 48.6 nF |
| $L_a = n_s L_s = 14L_s$ | 132 nH |
| $R_a = n_s R_s = 14R_s$ | 0.246 Ω |
| $U_{a(100\ kV)} = n_s U_s = 14U_s$ | 190.4 kJ |
| $Z_a = 1.1\sqrt{\frac{L_a}{C_a}} + 0.8\ R_a = n_s Z_s = 14Z_s$ | 2 Ω |

The operation of the pulsed-power driver 100 according to the present teachings can include a step of DC-charging the capacitors 120 of each brick 112 to a high voltage with a suitable charging system (not shown). For example, in the case of two 100-kV-80-nF capacitors 120 per brick 112, the capacitors 120 can be charged in a balanced manner, such that +100 kV appears across one of the capacitors 120, −100 kV appears across the other capacitor 120, and therefore 200 kV appears across the switch 122.

The operation of the pulsed-power driver 100 can also include a step of triggering the switch 122 of each brick 112 with a suitable triggering system (not shown). In some embodiments, all the bricks 112 within each stage 118 are triggered simultaneously, and the stages 118 can be triggered in a successive manner, from the upstream-most one to the downstream-most one, with a time delay r between each stage 118. When the pulsed-power driver 100 is triggered in this manner, the circuit of FIG. 10A can be reduced to that shown in FIG. 10B. In some embodiments, the time delay r can range from about 1 ns to about 100 ns. Upon successively triggering of the stages 118, a high-voltage pulse is generated that leads to current flowing (the solid arrows in FIG. 10A represent the current flow) in a direction of the load (e.g., $Z_{load}$) along the transmission line 110 (at outputs of the stages 118 represented by the two dots) and through the stages 118. Furthermore, electromagnetic power propagating in the gap between the inner conductor 114 and the outer conductor 116 (the dashed arrows in FIG. 10A represents the electromagnetic power flow). As noted above, the inner conductor 114 has a tapered configuration (e.g., with stepped or linear profile) to gradually increase the gap with the outer conductor 116 designed to match the (combined, equivalent) impedance of the stages 118 as the electromagnetic power flows downstream along the transmission line 110.

In some exemplary embodiments according to the present disclosure, the inner conductor 114 may be configured as a cathode and the outer conductor 116 may be configured as an anode (i.e., the outer conductor 116 is positively biased with respect to the inner conductor 114 at the downstream end 106). In some exemplary embodiments according to the present disclosure, the inner conductor 114 may be configured as an anode and the outer conductor 116 may be configured as a cathode (i.e., the inner conductor 116 is positively biased with respect to the outer conductor 114 at the downstream end 106).

Figure 11:
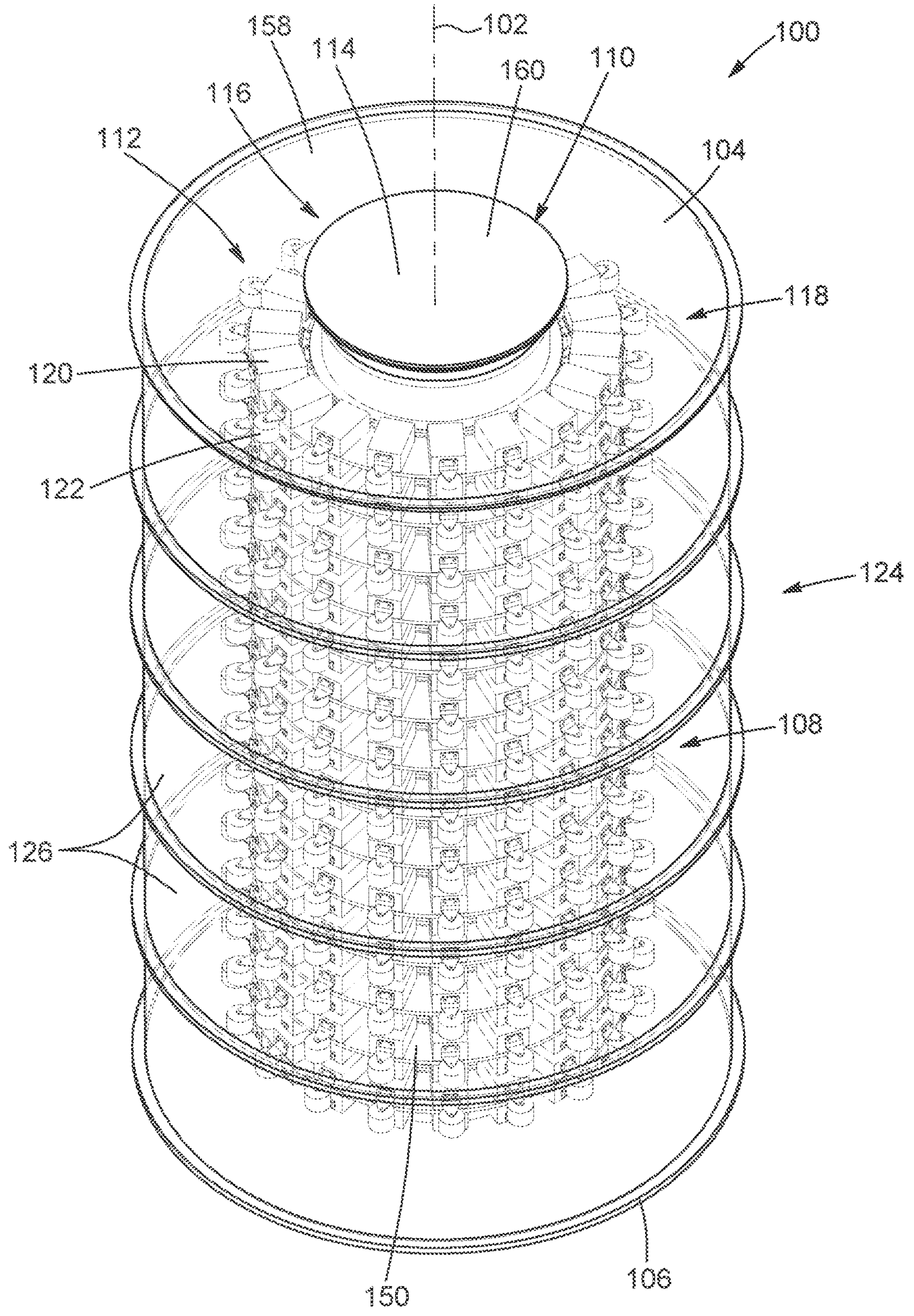

Referring to FIGS. 13A to 13F, there are depicted steps of a method according to the present disclosure for assembling a pulsed-power driver 100 implemented in a vertical arrangement, such as that illustrated in FIGS. 11 and 12. More particularly, FIGS. 13A to 13F depict related steps for installing (e.g., assembling, adding) an additional stage 118 on top of a stack of one or more already-installed (e.g., assembled, added) stages 118 supported by an insulator stand 128. It is noted that the enclosure 124 has been omitted in FIGS. 13B to 13E for clarity. It is noted that the enclosure 124 may be installed after assembly of all the stages 118, or gradually, one enclosure segment 126 at a time when a sufficient number of stages are assembled.

Figure 13A:
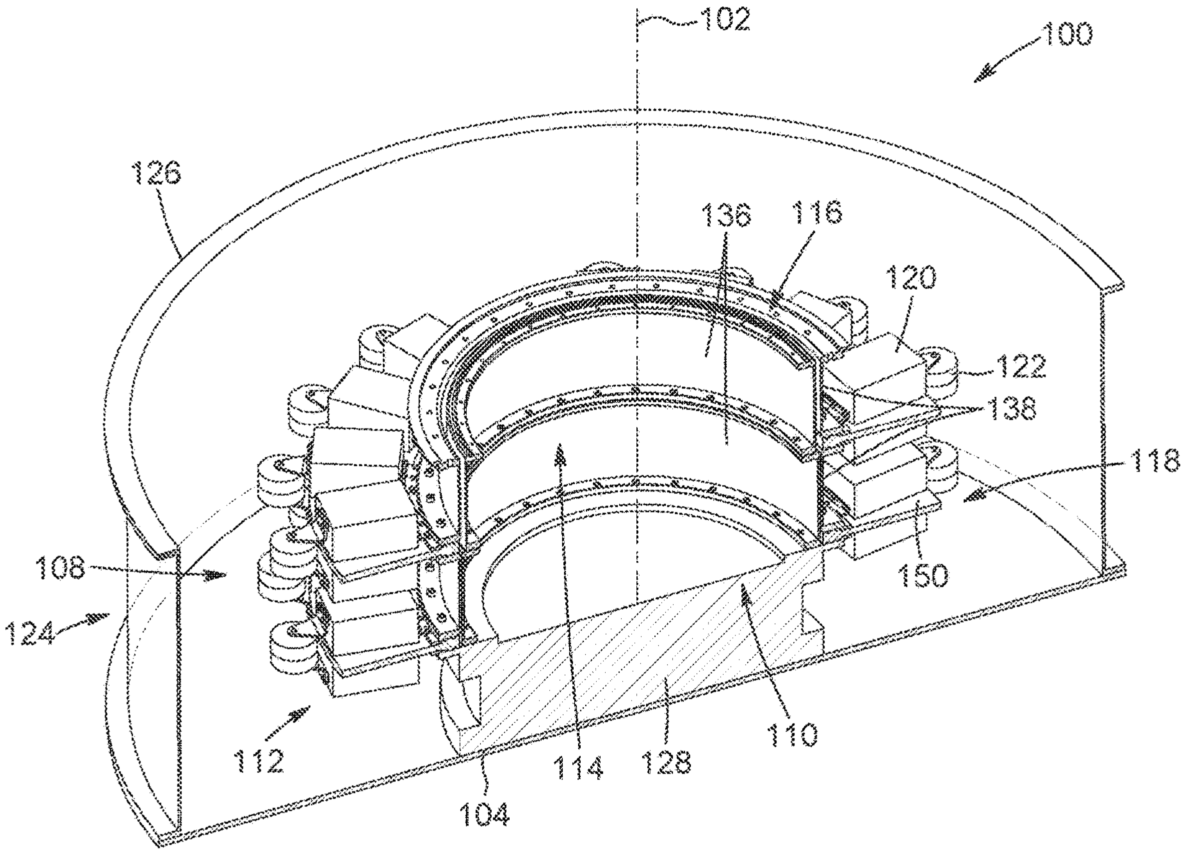
Figure 13B:
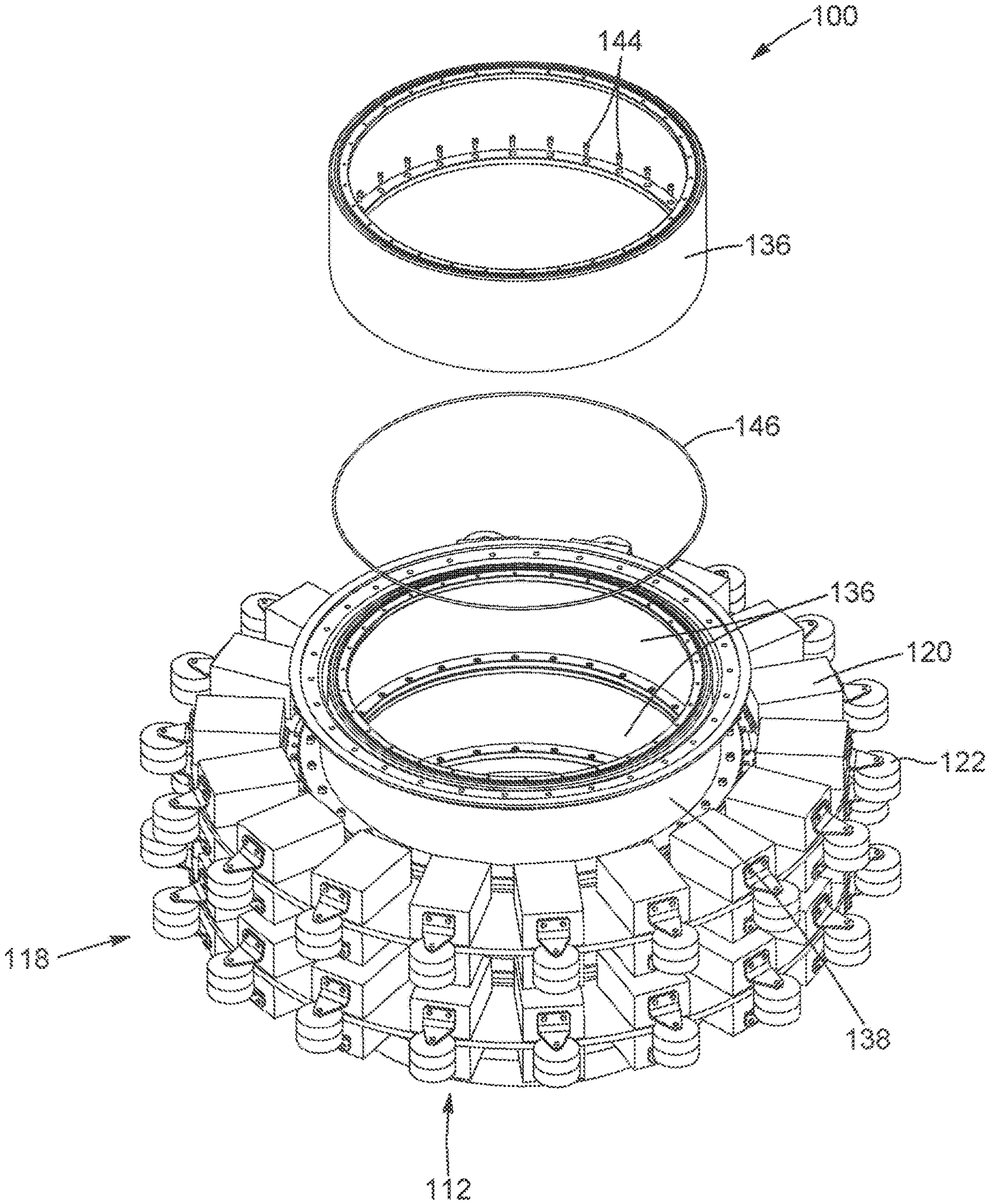

In the step depicted in FIG. 13B, an additional inner conductor segment 136 is connected to the upper-most already-installed inner conductor segment 136 in FIG. 13A using a sealed mechanical connection that includes a plurality of azimuthally spaced bolts 144 (e.g., compression bolts) and at least one gasket 146, which together can provide a durable and leak-tight yet releasable joint.

Figure 13C:
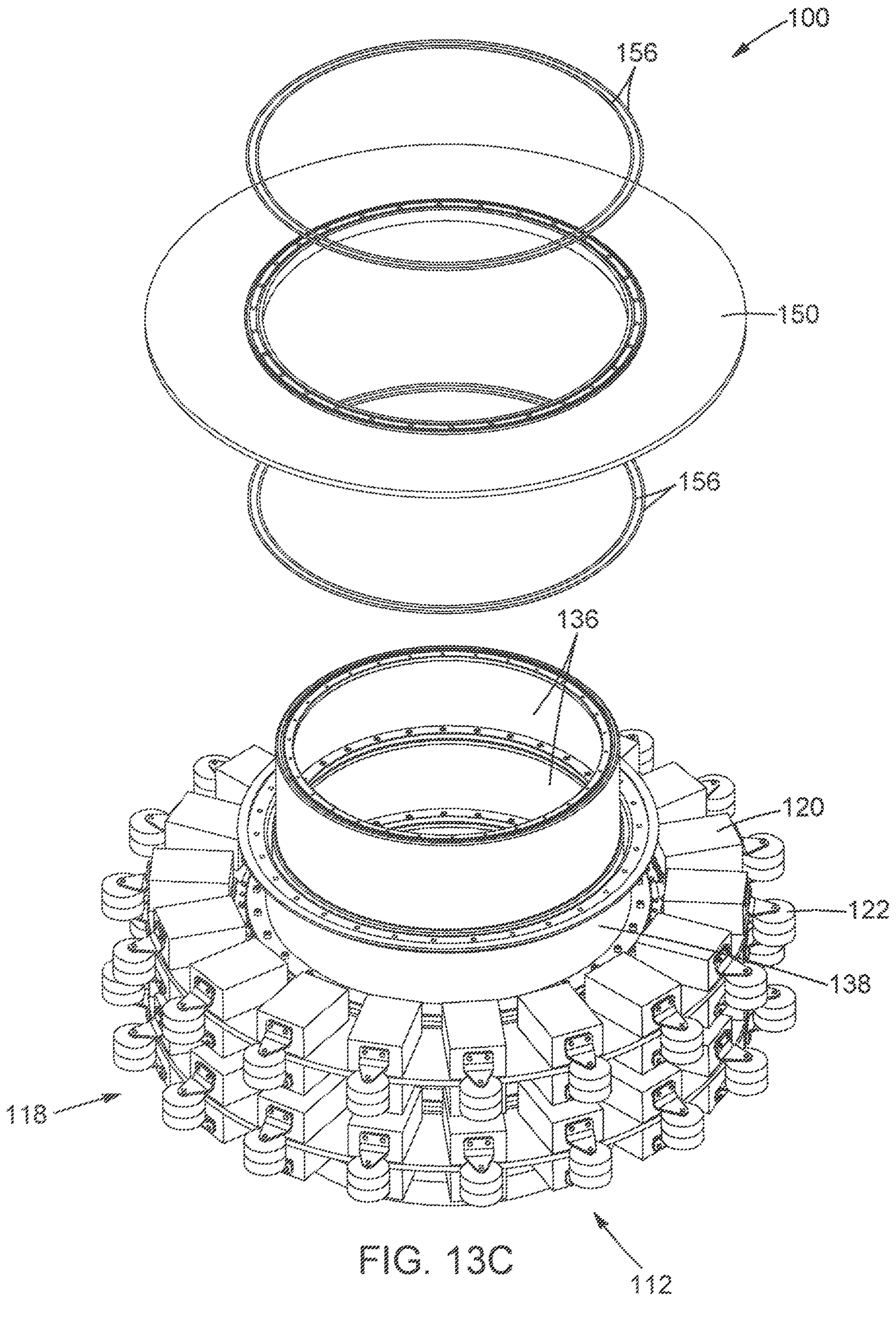

In the step depicted in FIG. 13C, an annular-shaped stage insulator 150 with a set of gaskets 156 inserted into grooves formed on each side of the stage insulator 150 is disposed on the upper-most already-installed outer conductor segment 138.

Figure 13D:
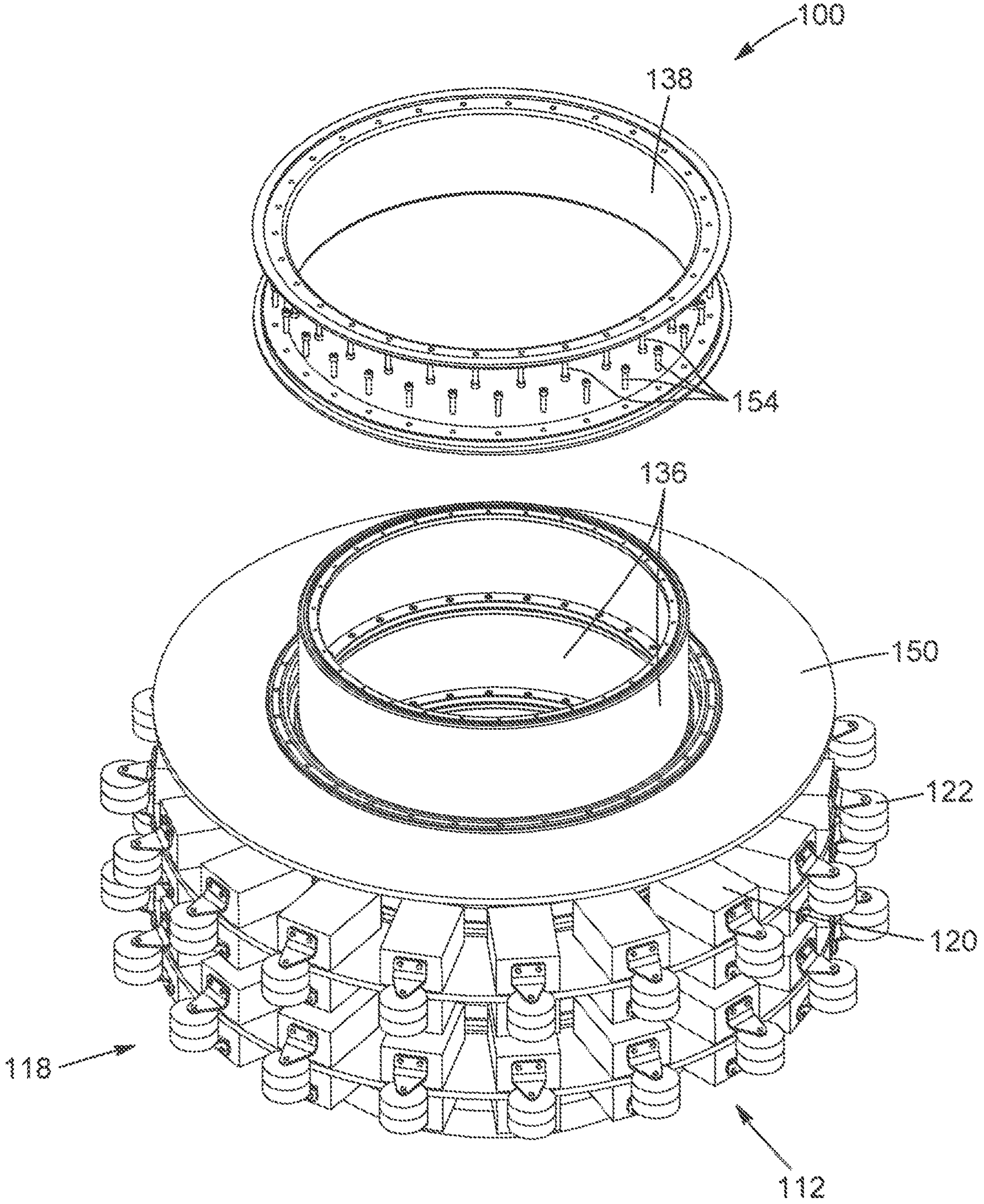

In the step depicted in FIG. 13D, an additional outer conductor segment 138 is connected to the upper-most already-installed outer conductor segment 138 with the stage insulator 150 provided in the step depicted in FIG. 13C interleaved therebetween. The two outer conductor segments 138 are connected to each other with the stage insulator 150 sandwiched therebetween using a plurality of azimuthally spaced bolts 154 (e.g., compression bolts) to act as a mechanical fastener, with the set of gaskets 156, provided in the step depicted in FIG. 13C, providing a leak-tight connection.

Figure 13E:
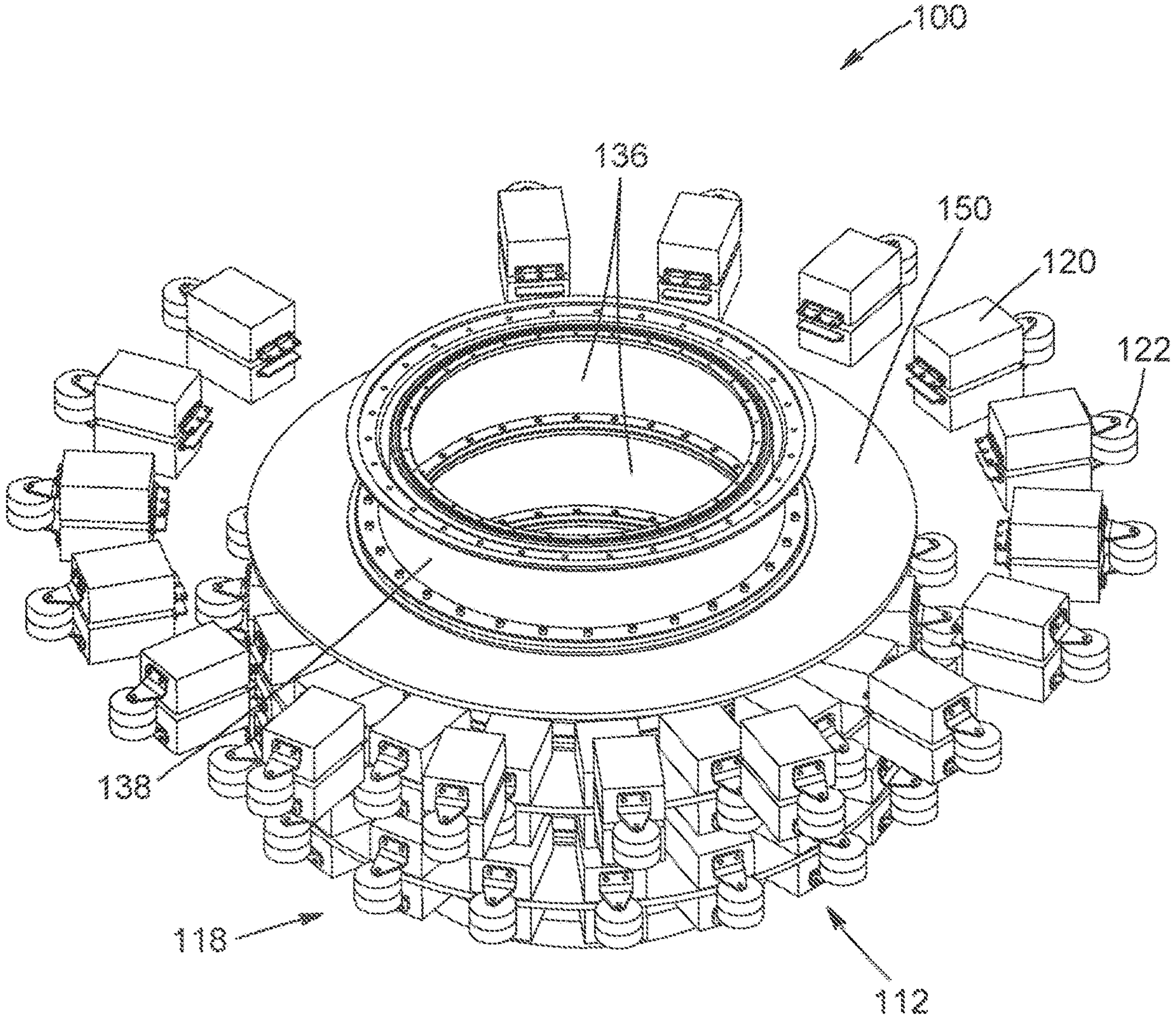

In the step depicted in FIG. 13E, the plurality of bricks 112 of the additional stage 118 are assembled so as to be electrically connected in series with the upper-most already-installed stage 118. In the illustrated arrangement, each brick 112 is configured to straddle the transition plane (as provided by the stage insulator installed in the step depicted in FIG. 13C) between the outer conductor segment 138 installed in the step depicted in FIG. 13D and the previous upper-most outer conductor segment 138, with one capacitor 120 of each brick 112 located upstream of the transition plane, the other capacitor 120 located downstream of the transition plane, and the switch 122 extending on both sides of the transition plane.

Figure 13F:
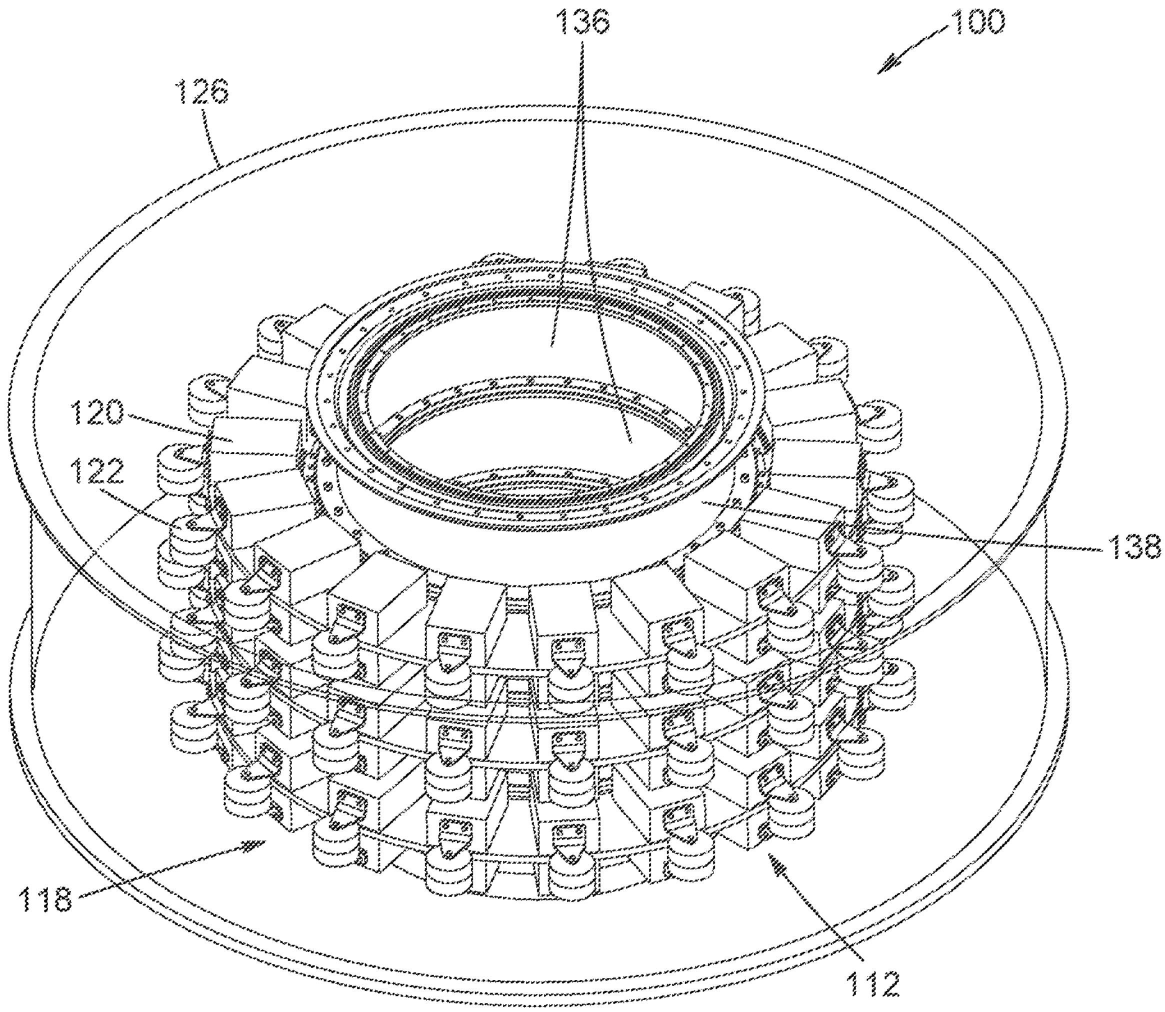

In the step depicted in FIG. 13F, the configuration of the pulsed-power driver 100 with the additional stage 118 and corresponding transmission line segments 136, 138 installed thereon is depicted. It is noted that further one or more additional stages 118 may be installed on top of the stack shown in FIG. 13F by repeating the steps illustrated in FIGS. 13B to 13E.

It is appreciated that the steps according to the present disclosure illustrated in FIGS. 13A to 13F can be performed in the reverse order in order to disassemble or otherwise remove a stage 118 and corresponding transmission line segments 136, 138 from the pulsed-power driver 100. It is also appreciated that the steps according to the present disclosure illustrated in FIGS. 13A to 13F can also be performed with a pulsed-power driver implemented in a horizontal arrangement (see, e.g., FIGS. 1 to 9).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting.

The invention claimed is:

1. A pulsed-power driver with modular construction, comprising:

a voltage adder assembly comprising a plurality of stages axially distributed along a longitudinal driver axis from an upstream end to a downstream end of the pulsed-power driver;

a transmission line comprising an inner conductor and an outer conductor coaxially disposed and extending along the driver axis from the upstream end to the downstream end, the outer conductor comprising a plurality of outer conductor segments; and a plurality of stage insulators longitudinally interleaved between each pair of adjacent outer conductor segments, wherein the outer conductor segments of the pair are mechanically connected to each other via an electrically insulating contact provided by a corresponding stage insulator of the plurality of stage insulators, and wherein the outer conductor segments of the pair are electrically connected to each other in series via a corresponding stage of the plurality of stages.

2. The pulsed-power driver of claim 1, wherein:

the corresponding stage comprises a number of pulse-forming circuits azimuthally distributed about the driver axis and electrically connected to one another in parallel.

3. The pulsed-power driver of claim 2, wherein:

each of the pulse forming circuits straddle a transition plane between the corresponding pair of adjacent outer conductor segments, the transition plane passing through the corresponding stage insulator.

4. The pulsed-power driver of claim 3, wherein:

each of the pulse forming circuits includes a symmetrical arrangement of elements about the transition plane.

5. The pulsed-power driver of claim 3, wherein:

each of the pulse-forming circuits comprises, in sequence, an upstream capacitor, a switch, and a downstream capacitor, electrically connected in series, a terminal of the upstream capacitor is electrically connected to an upstream outer conductor segment of the pair, and a terminal of the downstream capacitor is electrically connected to a downstream outer conductor segment of the pair.

6. The pulsed-power driver of claim 5, wherein:

the upstream capacitor is arranged upstream the stage transition plane, the downstream capacitor is arranged downstream the stage transition plane, and the switch is arranged across the stage transition plane.

7. The pulsed-power driver of claim 1, wherein:

the electrically insulating contact is a hermetic seal.

8. The pulsed-power driver of claim 7, wherein:

the outer conductor segments of the pair include flanged ends, the corresponding stage insulator interleaved between the flanged ends, and the hermetic seal is provided by a set of gaskets or O-rings inserted into grooves formed on both sides of the corresponding stage insulator.

9. The pulsed-power driver of claim 8, wherein:

the flanged ends are mechanically fastened to the corresponding stage insulator via a plurality of azimuthally spaced bolts.

10. The pulsed-power driver of claim 1, wherein:
the inner conductor comprises a plurality of inner conductor segments.

11. The pulsed-power driver of claim 10, wherein:
inner conductor segments of each pair of adjacent inner conductor segments are connected to each other via a hermetically sealed mechanical connection.

12. The pulsed-power driver of claim 11, wherein:
the hermetically sealed mechanical connection is provided via a plurality of azimuthally spaced bolts and at least one gasket or O-ring.

13. The pulsed-power driver of claim 12, wherein:
the inner conductor segments of the pair include flanged ends, and
the at least one gasket or O-ring is inserted in a groove formed in at least one of the flanged ends.

14. The pulsed-power driver of claim 13, wherein:
the flanged ends of the inner conductor segments are mechanically fastened to each other via a plurality of azimuthally spaced bolts.

15. The pulsed-power driver of claim 10, wherein:
the inner conductor segments include radii that gradually decrease from the upstream-most to the downstream-most of the inner conductor segments.

16. The pulsed-power driver of claim 15, wherein:
each inner conductor segment of the plurality of inner conductor segments includes a cylindrical shape having a constant radius.

17. The pulsed-power driver of claim 15, wherein:
each inner conductor segment of the plurality of inner conductor segments includes a frustoconical shape having a varying radius.

18. The pulsed-power driver of claim 1, further comprising:
a cylindrical stand made from an electrically insulating material arranged at the upstream end, the inner conductor and the outer conductor connected to the cylindrical stand.

19. The pulsed-power driver of claim 18, wherein:
the pulsed-power driver is a vertical pulsed-power driver that is configured to be operated while standing on the cylindrical stand with the driver axis parallel to a gravity vector.

20. The pulsed-power driver of claim 1, further comprising:
a tubular enclosure surrounding the voltage adder assembly and extending along the driver axis from the upstream end to the downstream end.

21. The pulsed-power driver of claim 1, further comprising:
an oil section included in a volume between the tubular enclosure and the outer conductor that includes the voltage added assembly;
a deionized water section included in a volume between the outer conductor and the inner conductor; and
an air section included in an inner volume of the inner conductor.

22. A method for manufacturing a pulsed-power driver, the method comprising:
partitioning the pulsed-power driver into a plurality of stackable stages, each stage of the plurality of stackable stages comprising:
one or more bricks of a voltage adder of the pulsed power driver;
one inner conductor segment of a transmission line of the pulsed power driver;
one outer conductor segment of a transmission line of the pulsed power driver; and
one annular stage insulator,
providing a cylindrical stand made of an insulating material; and
vertically stacking the plurality of stackable stages on the cylindrical stand by assembling an additional stage of the plurality of stackable stages on top of an already-assembled stage.

23. The method according to claim 22, wherein the assembling of the additional stage comprises:
i) connecting the inner conductor segment of the additional stage to the inner conductor segment of an upper-most already-assembled stage using a sealed mechanical connection;
ii) arranging the annular stage insulator of the additional stage on the outer conductor segment of the upper-most already-assembled stage;
iii) connecting the outer conductor segment of the additional stage to the outer conductor segment of the upper-most already-installed stage with the annular stage insulator of the additional stage interleaved therebetween; and
iv) assembling each of the one or more bricks of the additional stage about a transition plane that passes through the annular stage insulator of step ii), thereby electrically connecting each of the one or more bricks in series between the outer conductor segment of the upper-most already-installed stage and the outer conductor segment of the additional stage.

24. The method according to claim 23, further comprising:
disassembling of the upper-most already-assembled stage by substantially applying above steps i) through iv) in reverse order, comprising:
v) disassembling each of the one or bricks of the upper-most already-installed stage;
vi) disconnecting the outer conductor segment of the upper-most already-installed stage;
vii) removing the annular stage insulator of the upper-most already-assembled stage; and
viii) disconnecting the inner conductor segment of the upper-most already-assembled stage.

* * * * *